US006384996B1

(12) United States Patent
Kim

(10) Patent No.: US 6,384,996 B1
(45) Date of Patent: May 7, 2002

(54) INSERTION OF ONES AND ZEROES INTO I-NRZI MODULATION FOR MAGNETIC RECORDING APPARATUS TO FACILITATE HEAD TRACKING

(75) Inventor: Soon-tae Kim, Kumi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/472,275

(22) Filed: Jun. 7, 1995

(30) Foreign Application Priority Data

Oct. 31, 1994 (KR) ............................................ 94-28377

(51) Int. Cl.[7] ................................................ G11B 5/09
(52) U.S. Cl. .............................. 360/40; 360/41; 341/59; 341/68
(58) Field of Search ........................... 360/24, 40, 19.1, 360/32, 38.1, 51, 41; 341/59, 68; 375/292

(56) References Cited

U.S. PATENT DOCUMENTS 5,140,474 A * 8/1992 Kahlman et al. .............. 360/40
5,142,421 A * 8/1992 Kahlman et al. .............. 360/40

* cited by examiner

Primary Examiner—Aristotelis M. Psitos
(74) Attorney, Agent, or Firm—Sughrue Mion, PLLC

(57) ABSTRACT

In digital signal recording apparatus using I-NRZI modulation for recording, the need for intermittently reading or intermittently writing buffer storage is eliminated by using parallel-bit precoding to generate the channel words that are selected between for recording. The precoders perform preceding on an accelerated basis using ripple-through integration of the alternate successive bits used to form each channel word. Two precoders generate (n+1)-parallel-bit channel words at a channel word rate slower by a factor of (n+1) than the rate of a system clock for the I-NRZI modulation. This leaves additional time during each channel word interval to carry out a decision procedure, which determines which of the channel words generated by the two precoders is to be selected for recording. There is also sufficient additional time for completing a subsequent updating procedure, in which precoding information stored in the precoder that did not generate the selected channel word is altered, to conform to preceding information stored in the precoder that did generate the selected channel word. The parallel-bit channel words from the precoders are converted to serial-bit format for recording with a bit rate equal to that of the system clock. The parallel-bit channel words from the precoders are converted to serial-bit format with an effective bit rate that is substantially higher than that of the system clock, to provide signal for timely implementing the decision and updating procedures.

31 Claims, 18 Drawing Sheets

FIG. 6

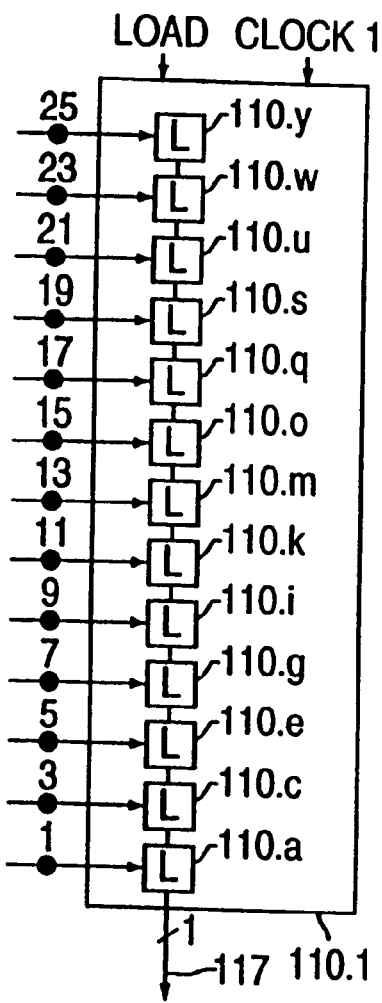 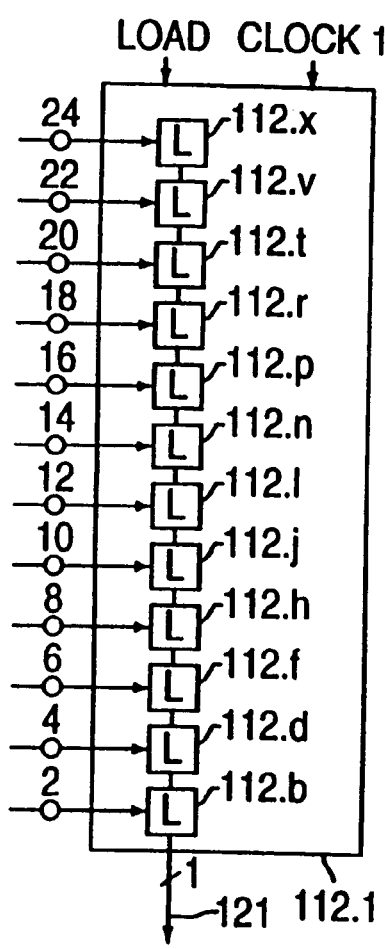
FIG. 8B     FIG. 8C

FIG. 14B

|   | ADDRESS | DATA |
|---|---------|------|
| 0 | 00000 | 90A |
| 1 | 00001 | 90B |
| 2 | 00010 | 90C |
| 3 | 00011 | 90D |
| 4 | 00100 | 90E |
| 5 | 00101 | 90F |
| 6 | 00110 | 90G |
| 7 | 00111 | 90H |
| 8 | 01000 | 90I |
| 9 | 01001 | 90J |
| 10 | 01010 | 90K |
| 11 | 01011 | 90L |
| 12 | 01100 | 90M |
| 13 | 01101 | 90N |
| 14 | 01110 | 90O |
| 15 | 01111 | 90Q |
| 16 | 10000 | 90R |

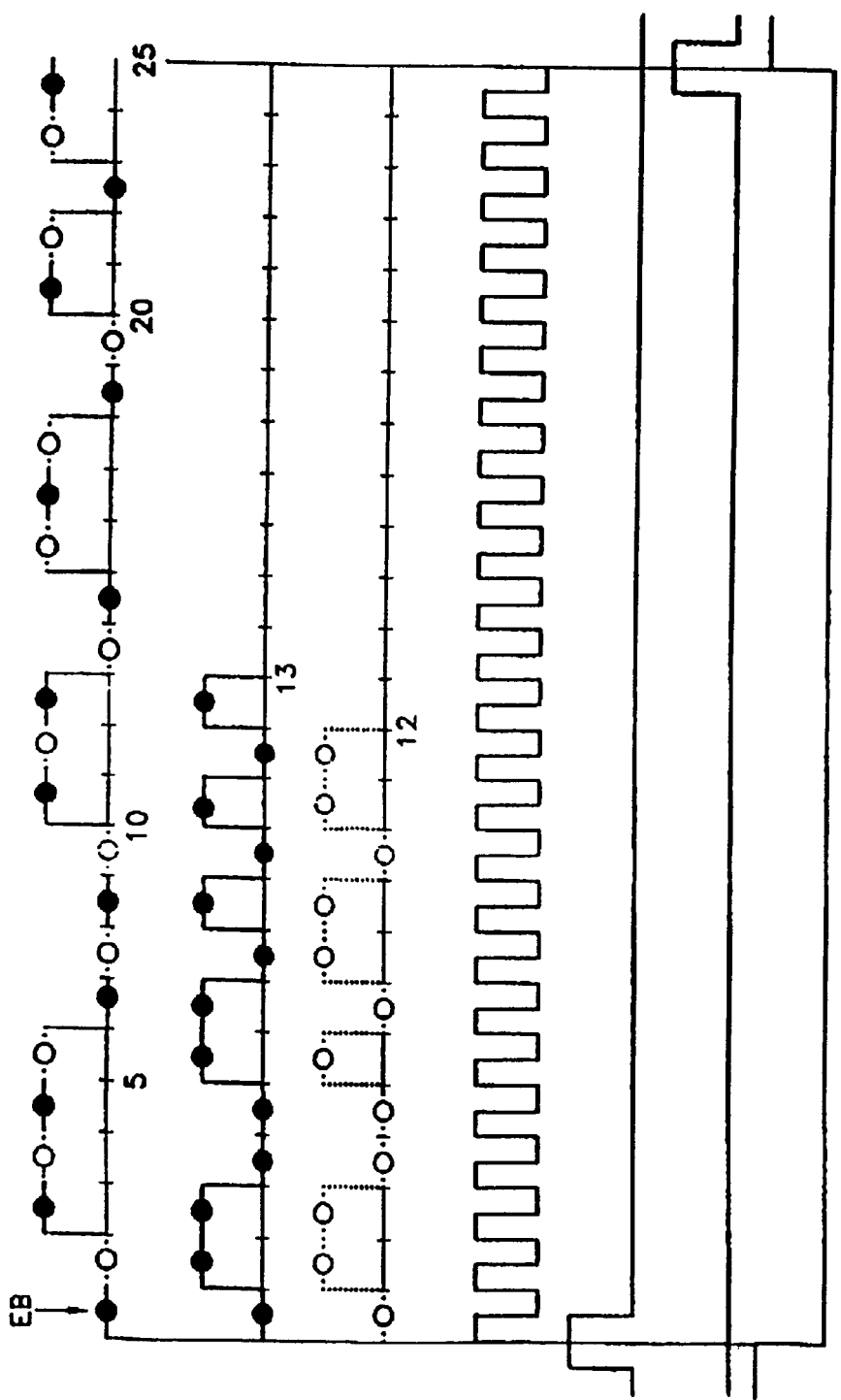

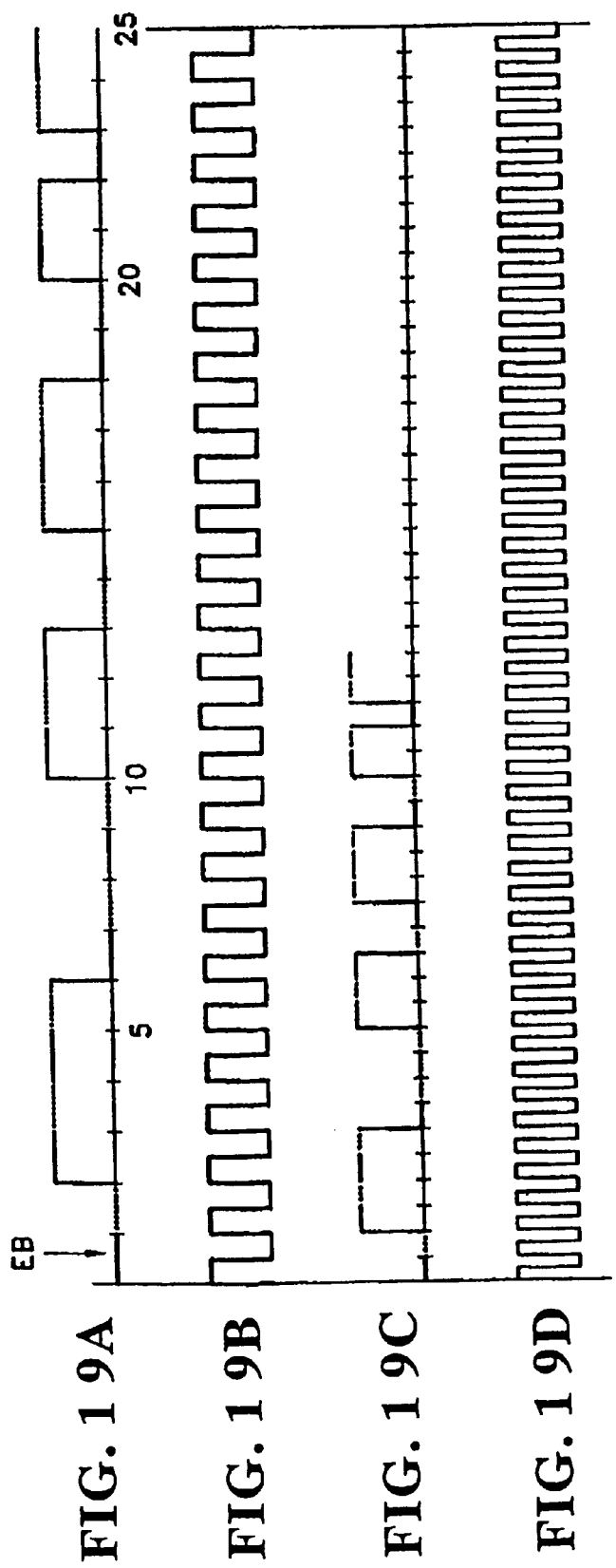

INSERTION OF ONES AND ZEROES INTO I-NRZI MODULATION FOR MAGNETIC RECORDING APPARATUS TO FACILITATE HEAD TRACKING

The present invention relates to digital signal recording apparatus recording interleaved non-return-to-zero, invert-on-ONEs (I-NRZI) modulation that includes pilot signals used for head tracking during playback.

BACKGROUND OF THE INVENTION

In a magnetic recording/reproducing apparatus such as a videocassette recorder, as a head deviates from a track on a magnetic recording medium during playback, head output is decreased and errors increase. This precludes the normal reproduction of an image, so it is required for the head to trace a target track precisely. In other words, it is necessary to maintain head tracking. In order to extend recording time in a digital videocassette recorder for home use, tracks are especially narrow, which increases the precision of the head tracking needed for satisfactory reproduction of images. Among the methods for detecting head tracking error, or deviation from ideal tracking, are methods that use different respective pilot signals for successive tracks to facilitate comparison of the crosstalk of the pilot signals from the tracks preceding and succeeding the track being most closely followed by the head, thus to detect whether the head tracking deviates toward the preceding track or toward the succeeding track. The pilot signals take the form of peaks and notches in the frequency spectra of the digital signals recorded on the tracks by selecting between two types of interleaved non-return to-zero, invert-on-ONEs (I-NRZI) modulation. The same information is encoded into two parallel-in-time sets of serially supplied channel words; and the channel words that are selected from one or the other of the sets to control I-NRZI modulation during recording, are selected so the I-NRZI modulation will deviate least from the pilot signal criterion for each recording track. When the selection of the channel word is completed, preceding information stored in the precoder that did not generate the selected channel word is altered, to conform to preceding information stored in the precoder that did generate the selected channel word. This is done to provide continuity of the preceding procedures and of the decoding procedures subsequent to the I-NRZI modulation being recovered from the recording medium during playback and demodulated. When the selection of the channel word is completed, integrators in the circuitry for determining which channel word is to be selected have to have their contents updated to reflect which channel word was in fact selected for recording. Such methods are described in U.S. Pat. No. 5,142,421 issued Aug. 25, 1992 to Kahlman et alii, entitled "*DEVICE FOR RECORDING A DIGITAL INFORMATION SIGNAL ON A RECORD CARRIER*" and incorporated herein by reference.

In Kahlman et alii the generation of the I-NRZI modulation is done on a serial-bit basis. This does not lend itself to pipeline operation in which channel words selected from the serial-bit precoders are recorded on the magnetic recording medium, after some fixed delay to accommodate the selection circuitry. It takes some time after a pair of respective channel words are generated, for a decision procedure that determines which of them will be recorded. After the decision procedure, it then takes some further time for updating stored information in the precoders. These decision and updating procedures must be completed before further preceding is possible, so the delays caused by these decision and updating procedures introduce gaps into the continuous flow of bits as regularly clocked by synchronous clocking methods. The decision procedures have considerable delay time associated with them to permit digital multiplication, addition, integration and squaring procedures to be carried out, although squaring time can be reduced by using look-up tables stored in read-only memory. Accordingly, first-in/first-out buffer storage that can be intermittently read from has to be provided before the serial-bit precoders; and first-in/first-out buffer storage that can be intermittently written with the selected channel words and subsequently continuously read from has to be provided for channel words generated by the serial-bit precoders. The generation of clocking signals for the buffer storage is somewhat complex, so it is desired to avoid the need for intermittently written or intermittently read buffer storage.

SUMMARY OF THE INVENTION

In digital signal recording apparatus using I-NRZI modulation for recording, the need for intermittently reading or intermittently writing buffer storage associated therewith is eliminated by the invention. The preceding, used to generate the codes that control the generation of I-NRZI modulation, is performed on a serial-word, parallel-bits-per-word basis. The precoders are modified to perform precoding on an accelerated basis using ripple-through integration of the alternate successive bits used to form each channel word. Two precoders then generate (n+1)-parallel-bit channel words at a channel word rate slower by a factor of (n+1) than the rate of a system clock. This leaves additional time during each channel word interval to carry out a decision procedure that determines which of the channel words is to be selected for recording. There is also sufficient additional time to complete a subsequent updating procedure, in which preceding information stored in the precoder that did not generate the selected channel word is altered, to conform to precoding information stored in the precoder that did generate the selected channel word. The serial-word, parallel-bit channel words from the precoders that are selected for being recorded on the magnetic recording medium are converted to serial-bit format, with a bit rate equal to that of the system clock for the I-NRZI modulation being recorded. The serial-word, parallel-bits-per-word, codestreams from the precoders are converted to serial-bit format with an effective bit rate that is substantially higher than that of the system clock, to provide signal for implementing the decision and updating procedures in timely fashion.

In certain preferred embodiments of the invention the channel words from the precoders are each separated into two component subwords or divided-channel words when converted to serial-bit format, to form two parallel bitstreams each having a bit rate that is the same as the system clock used to control the I-NRZI modulation being recorded. The two parallel bitstreams provide input for the computations performed to determine which of the channel words is to be recorded, which input has an effective bit rate twice that of the system clock.

In alternative embodiments of the invention, in order to generate signals on which to base the computations performed for determining which of the channel words is to be recorded, channel words from the precoders are converted to serial-bit format having a bit rate that is actually twice the system clock rate used to control the I-NRZI modulation being recorded. The serial-bit channel words that have a bit rate twice system clock rate provide input for the computations performed to determine which of the channel words is to be recorded.

BRIEF DESCRIPTION OF THE DRAWING

FIG. 6 is a block diagram of digital signal recording apparatus that embodies the invention.

FIG. 14B is a table of data stored in read-only memory (ROM) for implementing the triangular wave generator.

FIGS. 16A–16G illustrate operation waveforms for blocks of the diagram shown in FIG. 6.

FIGS. 19A–19D illustrate operation waveforms of blocks of the diagram shown in FIG. 18.

In the block diagrams, blocks with the legend "P/P" are parallel-to-parallel converters for converting consecutive serial groups of parallel-bit data each to parallel-bit words; blocks with the legend "P/S" are parallel-to-serial converters for converting parallel-bit data to serial-bit data; blocks with the legend "INT" are digital integrators; blocks with the legend "SQ" are digital squaring circuits; and blocks with the legend "L" are bit latches.

DETAILED DESCRIPTION OF THE INVENTION

Figure 1:
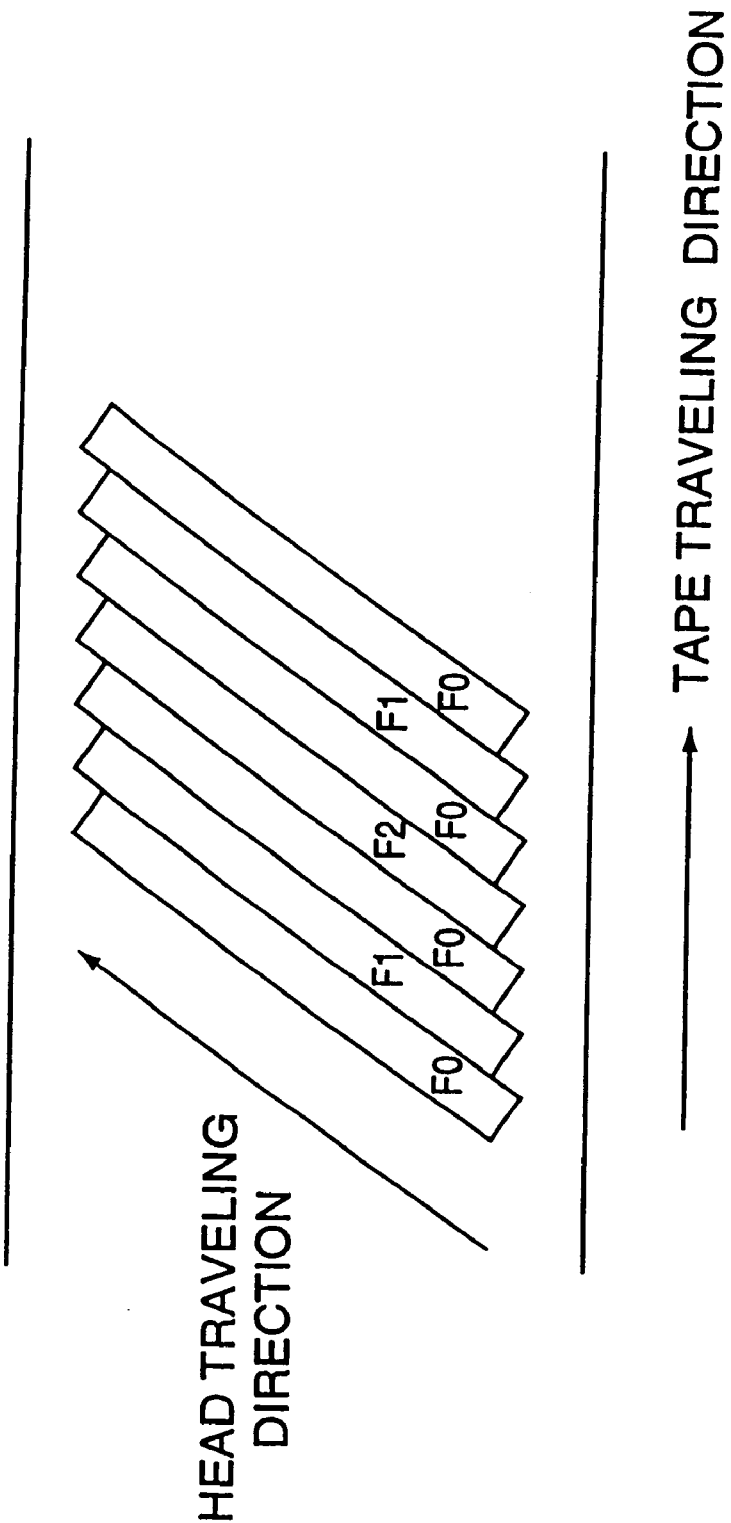
FIG. 1 depicts an illustrative pattern for recording a serial data stream of channel words on adjacent parallel tracks within the surface of a magnetic recording medium.

FIG. 1 illustrates how, in order to facilitate head tracking, helical-scan digital recording apparatus records a serial data stream of channel words in three spectral response patterns F0, F1 and F2 on successive parallel tracks of a magnetic recording medium. Per convention, the tracks are shown shorter in length and more skewed from the direction of tape travel than is the actual case. Pilot signals appear in the spectra of digital signals recorded in the sequence of F0, F1, F0, F2, . . . on the respective tracks of the magnetic recording medium. The pilot signals take the form of notches or peaks at prescribed frequencies that are introduced into the frequency-domain spectral energy response (Fourier transform) of the signals recorded on the tracks. When playing back from any one of these tracks of a particular pattern, certain deviations of the frequency-domain spectral pattern, certain deviations of the frequency-domain spectral energy response from expected values is ascertained. Such deviations are ascribed to pick-up of the digital signals from the preceding and succeeding tracks, in order to estimate the relative proximity of the head to the preceding track and to the succeeding track, from which the tracking error of the head can be determined. The illustrated sequential pattern F0, F1, F0, F2 is merely exemplary, since in practice the number of patterns and the recording sequence can be different from that of the illustration. U.S. Pat. No. 5,142,421 describes certain of these variants.

Figure 2A:
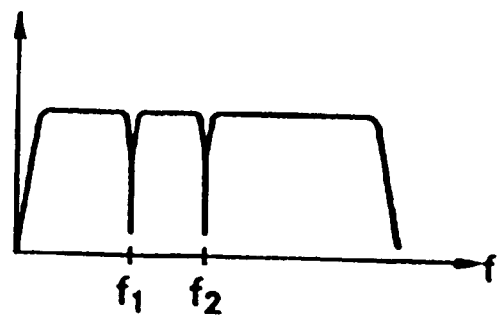
FIGS. 2A, 2B and 2C illustrate frequency spectra associated with the patterns shown in FIG. 1.
Figure 2B:
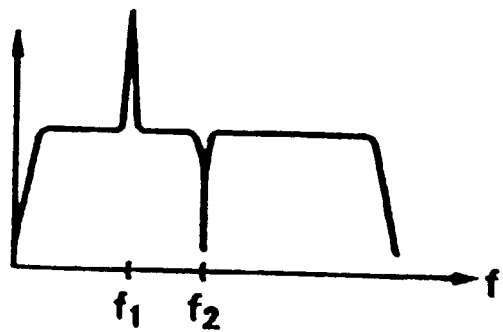
Figure 2C:
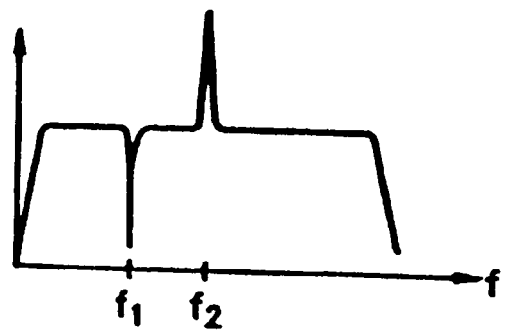

FIGS. 2A, 2B and 2C illustrate the frequency spectra of the serial-bit data streams of channel words bearing patterns F0, F1 and F2 shown in FIG. 1, respectively. In the frequency spectrum of the pattern F0, there are notches at frequencies $f_1$ and $f_2$ where the spectral energy is relatively small. In the frequency spectrum of the pattern F1, there is a pilot signal (peak) at frequency $f_1=\omega_1/2\pi$ where the spectral energy is relatively large, and there is a notch at frequency $f_2=\omega_2/2\pi$ where the spectral energy is relatively small. In the frequency spectrum of the pattern F2, there is a notch at frequency $f_1$ where the spectral energy is relatively small and a pilot signal (peak) at frequency $f_2$ where the spectral energy is relatively large.

During the playback of the pattern F0, a crosstalk effect between pilot signals (peaks $f_1$ and $f_2$) of the patterns F1 and F2 of adjacent tracks is used to determine tracking error. On one hand, if the head deviates from the center of the pattern F0 toward the pattern F1, the crosstalk of pilot signal from the pattern F1 becomes greater than that from the pattern F2. As a result, frequency component $f_1$ of a playback signal becomes greater and frequency component $f_2$ becomes smaller. On the other hand, if the head deviates from the center of the pattern F0 toward the pattern F2, the crosstalk of pilot signal from the pattern F2 becomes greater than that from the pattern F1. As a result, on average, frequency component $f_2$ of a playback signal becomes greater and frequency component $f_1$ becomes smaller. When playing back the pattern F0, then, comparing the average spectral energy of the playback signal at frequencies $f_1$ and $f_2$ enables the detection of deviation of head tracking. Using this result, precise tracking is made possible by controlling the height of a head element with a voltage applied to a piezo-electric element the head is mounted on, or by controlling the traveling speed of the magnetic recording medium (tape).

Figure 3:
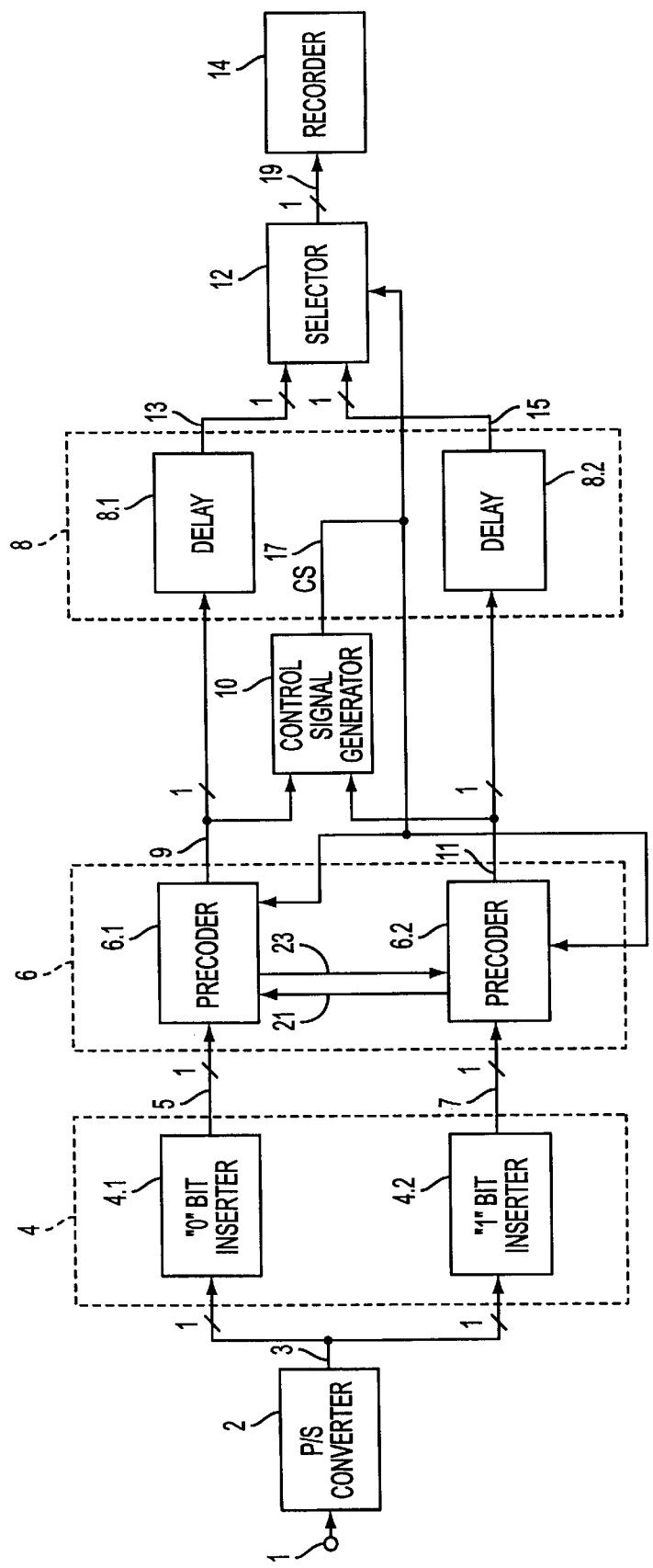
FIG. 3 is a block diagram of prior-art digital signal recording apparatus described in U.S. Pat. No. 5,142,421.

FIG. 3 is a block diagram of a digital signal recording apparatus disclosed in U.S. Pat. No. 5,142,421 issued Aug. 25, 1992 to Kahlman et alii, entitled *"DEVICE FOR RECORDING A DIGITAL INFORMATION SIGNAL ON A RECORD CARRIER"* and incorporated herein by reference. The schematic configuration and operation thereof will be described in regard to the conventional method for recording the patterns F0, F1 and F2.

In FIG. 3, 8-parallel-bit digital words are supplied via an input port 1 to a parallel-to-serial (P/S) converter 2. The P/S converter 2 converts, for instance, each succeeding group of three 8-parallel-bit digital words into a single 24-serial-bit digital information word supplied via a converter output port 3. A signal inserting portion 4 includes a "0" bit inserter 4.1 and a "1" bit inserter 4.2 each receiving as respective input signal the stream of 24-serial-bit digital information words appearing at the output port 3 of the P/S converter 2. The "0" bit inserter 4.1 inserts a single-bit digital prefix consisting of a "0" before the most significant bit (MSB) of each 24-serial-bit information word to generate a respective 25-serial-bit "positive" information word supplied from an output port 5 of the "0" bit inserter 4.1. The "1" bit inserter 4.2 inserts a single-bit digital prefix consisting of a "1" before the most significant bit (MSB) of each 24-serial-bit information word to generate a respective 25-serial-bit "negative" information word supplied from an output port 7 of the "1" bit inserter 4.2.

An encoder 6 includes a precoder 6.1 converting the "positive" information words to respective 25-serial-bit channel words supplied via a connection 9. The encoder 6 further includes a precoder 6.2 converting the "negative" information words to respective 25-serial-bit channel words supplied via a connection 11. In the remainder of this specification and in the claims appended to this specification, in order to distinguish between the channel words supplied from the precoder 6.1 and the channel words supplied from the precoder 6.2, the channel words supplied from the precoder 6.1 are referred to as "positive"-information channel words; and the channel words supplied from the precoder 6.2 are referred to as "negative"-information channel words. If the precoders 6.1 and 6.2 are 2T precoders, the single-bit prefix code causes them to generate two 25 serial-bit channel words in which the corresponding even bits are the same, and the corresponding odd bits are bit-complementary. A 2T precoder comprises a two-input exclusive-OR gate and a two-stage shift register providing an integrating feedback connection from the output connection of the exclusive-OR gate to a first of its input connections. The exclusive-OR gate receives the precoder input signal at its second input connection, supplies the precoder output signal at its output connection, and normally receives at its first input connection the precoder output signal as delayed 2T by passage through the two-stage shift register. The interval T is the sampling interval of the precoder input signal and the interval between clocked shifts of bits through the two-stage shift register. The feedback connection of the exclusive-OR gate provided by the two-stage shift register is referred to as the "integrating feedback connection" or simply the "integrating connection".

The precoder 6.1 supplies 25-serial-bit "positive"-information channel words via the connection 9 as its output signal; and the precoder 6.2 supplies 25-serial-bit "negative"-information channel words via the connection 11 as its output signal. Based on these 25-serial-bit channel words supplied in parallel from the precoders 6.1 and 6.2, a control signal generator 10 compares the respective frequency-domain spectral energy characteristics of each word to the prescribed spectral energy characteristics for the track that is to be recorded by a digital recorder 14 to determine which channel word deviates the least from the prescribed spectral response. The control signal generator 10 generates a control signal CS indicative of which of the channel words supplied from the precoders 6.1 and 6.2 deviates the least from the prescribed spectral response and should be selected for recording. Control signal CS is supplied via a connection 17 to the selection control port of a selector 12, which selects the output signal from one of the precoders 6.1 and 6.2 (as delayed by a time compensator 8) that deviates the least from the prescribed spectral response, for application to the digital tape recorder 14. Delays 8.1 and 8.2 of the time compensator 8 are needed to compensate for the time necessary for the control signal generator 10 to generate control signal CS for application to the selector 12. The control signal CS is also supplied via the connection 17 to respective control ports of the precoders 6.1 and 6.2 to control the transfer of the contents of the shift register in the one of the precoders 6.1 and 6.2 the output from which is selected for recording to the shift register in the other of the precoders 6.1 and 6.2, to provide for continuity of coding.

The selector 12 receives via a connection 13 the "positive"-information output of the precoder 6.1 as delayed by the delay 8.1 and receives via a connection 15 the "negative"-information output of the precoder 6.2 as delayed by the delay 8.2. In response to the control signal CS the selector 12 supplies a selected one of the delayed output signals of the precoders 6.1 and 6.2 via a connection 19 to the digital recorder 14 as input signal for recording. Some rate buffering is required in order that the bit modulation can be recorded at a constant bit rate by the digital recorder 14. The delays 8.1 and 8.2 can be fixed delays, with the rate buffering being provided after the selector 12; or, alternatively, the delays 8.1 and 8.2 may be first-in/first-out (FIFO) rate buffer memories that provide the necessary rate buffering in addition to always providing sufficient delay to complete the computations for deciding which of the output signals of the precoders 6.1 and 6.2 is to be recorded.

Figure 5:
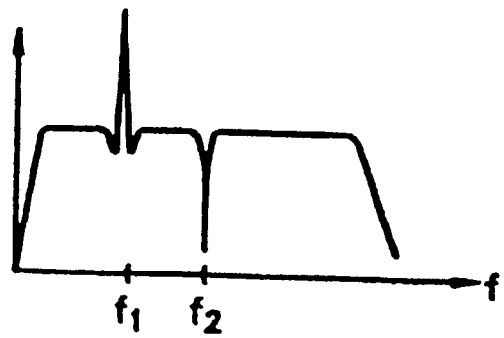
FIG. 5 illustrates one of the frequency spectra of the pattern of a serial data stream of channel words selected by a control signal generated from the control signal generator shown in FIG. 4.
Figure 4:
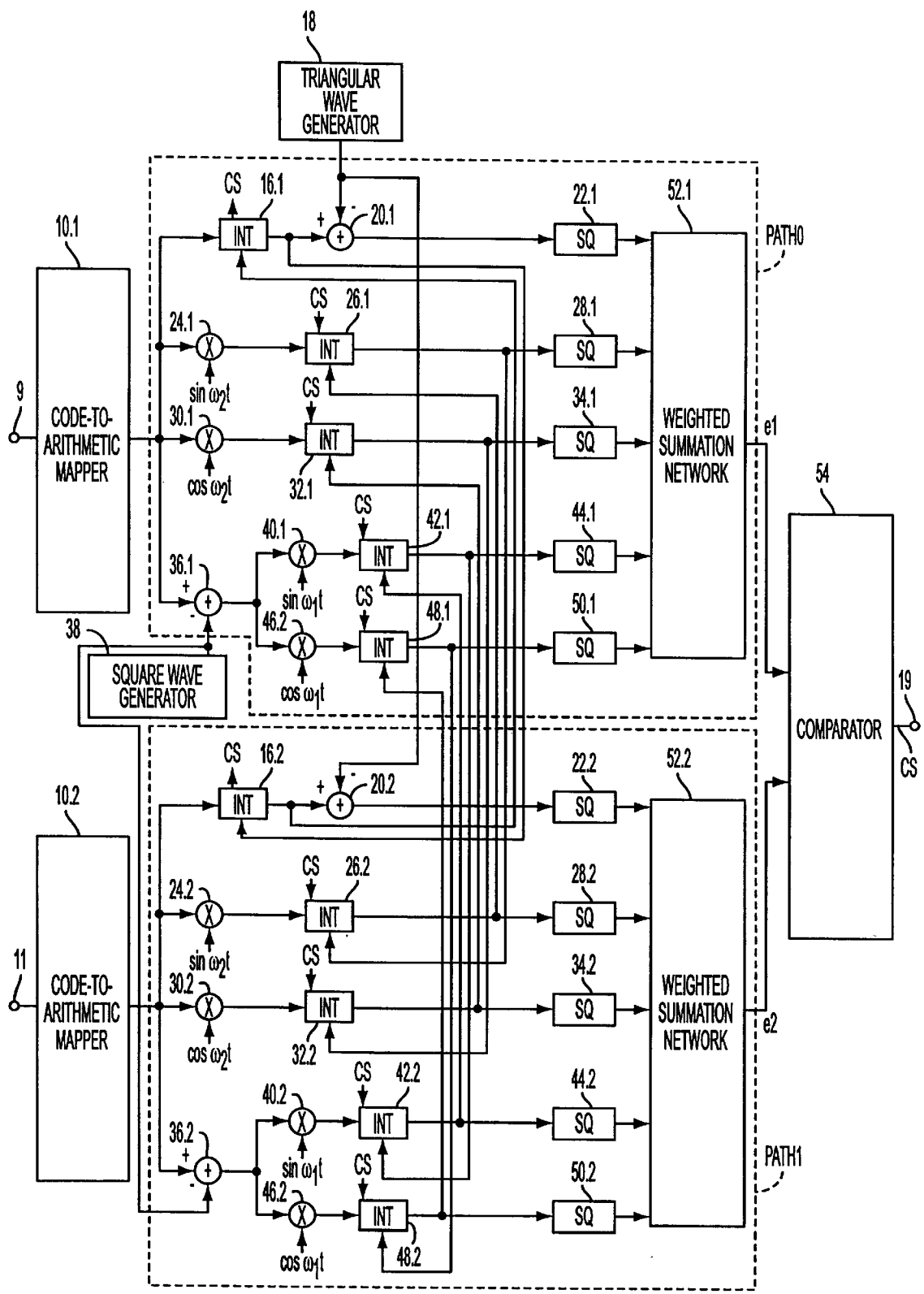
FIG. 4 is a detailed circuit diagram of a portion of an improved control signal generator for the digital signal recording apparatus shown in FIG. 3 which control signal generator generates selection signals for selecting channel words responsive to frequency spectrum analyses of proposed I-NRZ modulation performed digitally.

FIG. 4 is a detailed circuit diagram of an improved control signal generator for the FIG. 3 digital signal recording apparatus, as operated to generate a serial data stream of channel words with a frequency response spectrum as shown in FIG. 5. As compared with the spectrum of pattern F1 shown in FIG. 2B, in the spectrum shown in FIG. 5, dips occur on each side of $f_1$. These dips indicate that the noise power of the spectrum is reduced next to the pilot signal frequency $f_1$, which results in increased signal-to-noise ratio for the detection of pilot signal at frequency $f_1$.

The improved control signal generator of FIG. 4 differs from that described by Kahlman et alii in that it performs frequency spectrum analyses in the digital regime, rather than in the analog regime per Kahlman et alii, and in that it accordingly includes code-to-arithmetic mappers 10.1 and 10.2. The code-to-arithmetic mapper 10.1 converts the ONEs and ZEROs of the "positive"-information output of the precoder 6.1 to arithmetic descriptions of the I-NRZI modulation that switches between negative and positive arithmetic values of similar amplitude and is unaccompanied by a direct term. The code-to-arithmetic mapper 10.2 is similar in its construction to the code-to-arithmetic mapper 10.1. The code-to-arithmetic mapper 10.2 converts the ONEs and ZEROs of the "negative"-information output of the precoder 6.2 to arithmetic descriptions of the I-NRZI modulation that switches between negative and positive arithmetic values of similar amplitude and is unaccompanied by a direct term. By way of example, each of the mappers 10.1 and 10.2 can use the ONEs and ZEROs supplied thereto as a changing sign bit before an unchanging ONE, so the modulation is described in two's complement arithmetic terms.

A sine/cosine look-up table stored in read-only memory (ROM), not shown, generates a complex carrier of frequency $f_1$, having an angular frequency $\omega_1$ and composed of $\sin\omega_1 t$ and $\cos\omega_1 t$ components. Another sine/cosine look-up table stored in ROM, not shown, generates a complex carrier of frequency $f_2$, having an angular frequency $\omega_2$ and composed of $\sin\omega_2 t$ and $\cos\omega_2 t$ components. A triangular wave generator 18 generates a triangular signal corresponding to a digital sum value of an intended frequency ($f_1$) of the serial data stream of channel words, and a square wave generator 38 generates a square wave of frequency $f_1$. The triangular wave generator 18 and the square wave generator 38 can also be provided by look-up tables stored in ROM. The generation of all system functions in ROM simplifies processing the channel words in other than normal bit order.

Filter circuitry PATH0 determines how the spectral energy distribution of the I-NRZI modulation, when the generation thereof continues based on a "positive"-information channel word from the precoder 6.1, deviates from the desired spectral energy distribution for a track recorded with the F1 pattern having a peak at frequency $f_1$, a dip on either side of frequency $f_1$ and a notch at frequency $f_2$. A weighted summation circuit 52.1 combines with appropriate weighting the computed deviation from the desired notch at zero frequency and the desired peak at frequency $f_1$, as furnished from a squaring circuit 22.1, with the computed deviations from the other desired features. The computed deviations from the notch at the frequency $f_2$, as furnished for orthogonal phases of the frequency $f_2$ by squaring circuits 28.1 and 34.1, are weighted similarly to each other in the weighted summation circuit 52.1. The computed deviations from the dip on either side of frequency $f_1$, as furnished for orthogonal phases of the frequency $f_1$ by squaring circuits 44.1 and 50.1, are weighted similarly to each other in the weighted summation circuit 52.1. The effective weighting of the inputs to the weighted summation circuit 52.1 from the squaring circuits 28.1 and 34.1 is relatively large compared to the weighting of the input to the weighted summation circuit 52.1 from the squaring circuit 22.1, since lack of correct pilot frequency $f_1$ is better tolerated than presence of incorrect pilot frequency $f_2$ by the tracking correction circuitry used during playback. The effective weighting of the inputs to the weighted summation circuit 52.1 from the squaring circuits 44.1 and 50.1 is relatively small compared to the weighting of the input to the weighted summation circuit 52.1 from the squaring circuit 22.1. The filter circuitry PATH0 supplies, as the weighted sum output signal from the weighted summation circuit 52.1 therein, a first error signal e1.

The computation in the PATH0 system of the amount by which the spectral energy distribution of the I-NRZI modulation, when the generation thereof continues based on a "positive"-information channel word from the precoder 6.1, deviates from the desired notch at zero frequency and the desired peak at frequency $f_1$ peak is done in the following way. An integration circuit 16.1 receives the current "positive"-information channel word from the precoder 6.1, as converted to arithmetic form by the code-to-arithmetic mapper 10.1, and integrates it with a prestored value. A subtractor 20.1 subtracts the output signal of the triangular wave generator 18 from the output of the integration circuit 16.1; and a squaring circuit 22.1 for multiplies the resulting difference by itself; and the resulting square is supplied to the weighted summation network 52.1 to provide a component of the first error signal e1. The triangular wave generator 18 and the subtractor 20.1 provide detection circuitry for detecting any deviation from the prescribed digital sum needed for maintaining the desired pilot signal, of the digital sum value that the integration circuit 16.1 supplies. The squaring circuit 22.1 computes the energy of that deviation.

The computation in the PATH0 system of the amount by which the spectral energy distribution of the I-NRZI modulation, when the generation thereof continues based on a "positive"-information channel word from the precoder 6.1, deviates from the desired notch at frequency $f_2$ is done in the following way. A multiplier 24.1 multiplies the output of the precoder 6.1 by a sine-wave system function $\sin\omega_2 t$ of frequency $f_2$; an integration circuit 26.1 integrates the product from the multiplier 24.1; and the squaring circuit 28.1 squares the integration results from integration circuit 26.1 for application to the weighted summation network 52.1. A multiplier 30.1 multiplies the output of the precoder 6.1 by a cosine-wave system function $\cos\omega_2 t$ of frequency $f_2$; an integration circuit 32.1 integrates the product from the multiplier 30.1, and the squaring circuit 34.1 squares the integration results from integration circuit 32.1 for application to the weighted summation network 52.1. (The phrase "system function" is used in digital electronics to refer to a function in the analog regime that is described on a sampled-data basis by digital samples.)

The computation in the PATH0 system of the amount by which the spectral energy distribution of the I-NRZI modulation, when the generation thereof continues based on a "positive"-information channel word from the precoder 6.1, deviates from the desired dip on either side of a peak at frequency $f_1$ is performed in the following way. A subtractor 36.1 subtracts a square wave of frequency $f_1$ supplied by the square wave generator 38 from the output signal of the precoder 6.1. The square wave generator 38 and the subtractor 36.1 provide detection circuitry for detecting any deviation from the prescribed square wave of the "positive"-information serial-bit channel word that the precoder 6.1 supplies, as converted to arithmetic form by the code-to-arithmetic mapper 10.1. A multiplier 40.1 multiplies the subtractor 36.1 difference output signal by a sine-wave system function $\sin\omega_1 t$ of frequency $f_1$; an integration circuit 42.1 integrates the product from the multiplier 40.1; and a squaring circuit 44.1 squares the integration results from the integration circuit 42.1 for application to the weighted summation network 52.1. A multiplier 46.1 multiplies the subtractor 36.1 difference output signal by a cosine-wave system function $\cos\omega_1 t$ of frequency $f_1$, an integration circuit 48.1 integrates the product from the multiplier 46.1, and a squaring circuit 50.1 squares the integration results from the integration circuit 48.1 for application to the weighted summation network 52.1. Filter circuitry PATH1 determines the amount by which the spectral energy distribution of the I-NRZI modulation, when the generation thereof continues based on a "negative"-information channel word from the precoder 6.2, deviates from the desired spectral energy distribution for a track recorded with the F1 pattern having a peak at frequency $f_1$, a dip on either side of frequency $f_1$ and a notch at frequency $f_2$. A weighted summation circuit 52.2 in the filter circuitry PATH1 combines with appropriate weighting the computed deviation from the desired notch at zero frequency and the desired peak at frequency $f_1$, as furnished from a squaring circuit 22.2, with the computed deviations from the other desired features as supplied from squaring circuits 28.2, 34.2, 44.2 and 50.2. The weighted summation network 52.2 supplies, as the sum output signal therefrom, a second error signal e2. A comparator 54 compares the error signals e1 and e2 for generating the control signal CS, supplied to the selection control port of the selector 12 which selects the channel word having an error signal of a smaller value.

The computation in the PATH1 system of the amount by which the spectral energy distribution of the I-NRZI modulation, when the generation thereof continues based on a "negative"-information channel word from the precoder 6.2, deviates from the desired notch at zero frequency and the desired peak at frequency $f_1$ peak is done in the following way. An integration circuit 16.2 receives the current "negative"-information channel word from the precoder 6.2, as converted to arithmetic form by the code-to-arithmetic mapper 10.2, and integrates it with a prestored value. A subtractor 20.2 subtracts the output signal of the triangular wave generator 18 from the output of the integration circuit 16.2, and a squaring circuit 22.2 for multiplies the resulting difference by itself; and the resulting square is supplied to the weighted summation network 52.2 to provide a component of the second error signal e2. The triangular wave generator 18 and the subtractor 20.2 provide detection circuitry for detecting any deviation from the prescribed digital sum needed for maintaining the desired pilot signal, of the digital sum value that the integration circuit 16.2 supplies. The squaring circuit 22.2 computes the energy of that deviation.

The computation in the PATH1 system of the amount by which the spectral energy distribution of the I-NRZI modulation, when the generation thereof continues based on a "negative"-information channel word from the precoder 6.2, deviates from the desired notch at frequency $f_2$ is done in the following way. A multiplier 24.2 multiplies the output of the precoder 6.2 by a sine-wave system function $\sin\omega_2 t$ of frequency $f_2$; an integration circuit 26.2 integrates the product from the multiplier 24.1; and the squaring circuit 28.2 squares the integration results from integration circuit 26.2 for application to the weighted summation network 52.2. A multiplier 30.2 multiplies the output of the precoder 6.2 by a cosine-wave system function $\cos\omega_2 t$ of frequency $f_2$; an integration circuit 32.2 integrates the product from the multiplier 30.2, and the squaring circuit 34.2 squares the integration results from integration circuit 32.2 for application to the weighted summation network 52.1.

The computation in the PATH1 system of the amount by which the spectral energy distribution of the I-NRZI modulation, when the generation thereof continues based on a "negative"-information channel word from the precoder 6.2, deviates from the desired dip on either side of a peak at frequency $f_1$ is performed in the following way. A subtractor 36.2 subtracts a square wave of frequency $f_1$ supplied by the square wave generator 38 from the output signal of the precoder 6.2. The square wave generator 38 and the subtractor 36.2 provide detection circuitry for detecting any deviation from the prescribed square wave of the "negative"-information serial-bit channel word that the precoder 6.2 supplies, as converted to arithmetic form by the code-to-arithmetic mapper 10.2. A multiplier 40.2 multiplies the subtractor 36.2 difference output signal by a sine-wave system function $\sin\omega_1 t$ of frequency $f_1$; an integration circuit 42.2 integrates the product from the multiplier 40.2; and a squaring circuit 44.2 squares the integration results from the integration circuit 42.2 for application to the weighted summation network 52.2. A multiplier 46.2 multiplies the subtractor 36.2 difference output signal by a cosine-wave system function $\cos\omega_1 t$ of frequency $f_1$, an integration circuit 48.2 integrates the product from the multiplier 46.2, and a squaring circuit 50.2 squares the integration results from the integration circuit 48.2 for application to the weighted summation network 52.2.

The operation of the control signal generator 10 when generating the F1 pattern has been described. When generating the F2 pattern, the operation of the control signal generator 10 is modified by transposing $f_1$ and $f_2$, thereby also transposing $\omega_1$ and $\omega_2$. When generating the F0 pattern, the operation of the control signal generator 10 is modified, disabling the triangular wave generator 18 and disabling the square wave generator 38. Irrespective of whether the F0, F1 or F2 pattern is being generated, certain re-initialization procedures have to be followed subsequent to the decision being made as to whether to select a "positive"-information channel word provided by the precoder 6.1 or to select a "negative"-information channel word provided by the precoder 6.2 to determine the I-NRZI modulation to be recorded. These re-initialization procedures provide for continuity of coding and for enabling the control signal generator to establish a basis from which a decision can be made concerning which of the next pair of channel words is to be selected for recording.

In the latter regard, when the channel word that is to be recorded next has been determined, the contents of the integration circuits 16.1, 26.1, 32.1, 42.1 and 48.1 or the contents of the integration circuits 16.2, 26.2, 32.2, 42.2 and 48.2 have to be changed. If the newly selected channel word is of "negative"-information type, the contents of the integration circuits 16.1, 26.1, 32.1, 42.1 and 48.1 are changed to correspond to the contents of the integration circuits 16.2, 26.2, 32.2, 42.2 and 48.2, respectively. If the newly selected channel word is of "positive"-information type the contents of the integration circuits 16.2, 26.2, 32.2, 42.2 and 48.2 are changed to correspond to the contents of the integration circuits 16.1, 26.1, 32.1, 42.1 and 48.1, respectively.

As noted previously, when the channel word that is to be recorded next has been determined, preceding information from the "integrating feedback connection" of the one of the precoders 6.1 and 6.2 supplying the channel word which is selected for recording must be transferred into the "integrating feedback connection" of the other of the precoders 6.1 and 6.2. If the channel word selected for being recorded next was supplied from the precoder 6.1, the contents of the shift register in the integrating feedback connection of its exclusive-OR gate are transferred to corresponding positions in the shift register in the integrating feedback connection of the exclusive-OR gate in the precoder 6.2. On the other hand, if the channel word selected for being recorded next was supplied from the precoder 6.2, the contents of the shift register in the integrating feedback connection of its exclusive-OR gate are transferred to corresponding positions in the shift register in the integrating feedback connection of the exclusive-OR gate in the precoder 6.1.

In practice, however, there is substantial time delay before this transfer can be completed in the prior-art digital signal recording apparatus described in U.S. Pat. No. 5,142,421, which delay arises in the multipliers, integration circuits, and squaring circuits in the control signal generator 10. This delay which is particularly a problem when one attempts to digitize the control signal generator 10, necessitates intermittently written buffer storage after the encoder 6, as can be provided by the time compensator 8, and necessitates intermittently read buffer storage before the encoder 6, as can be provided by the parallel-to-serial converter 2. The arrangements for this intermittent reading and writing of buffer storage are, in practice, difficult to arrange clocking for and can be avoided in accordance with the invention by performing precoding on a parallel-bit-word basis.

Figure 6:
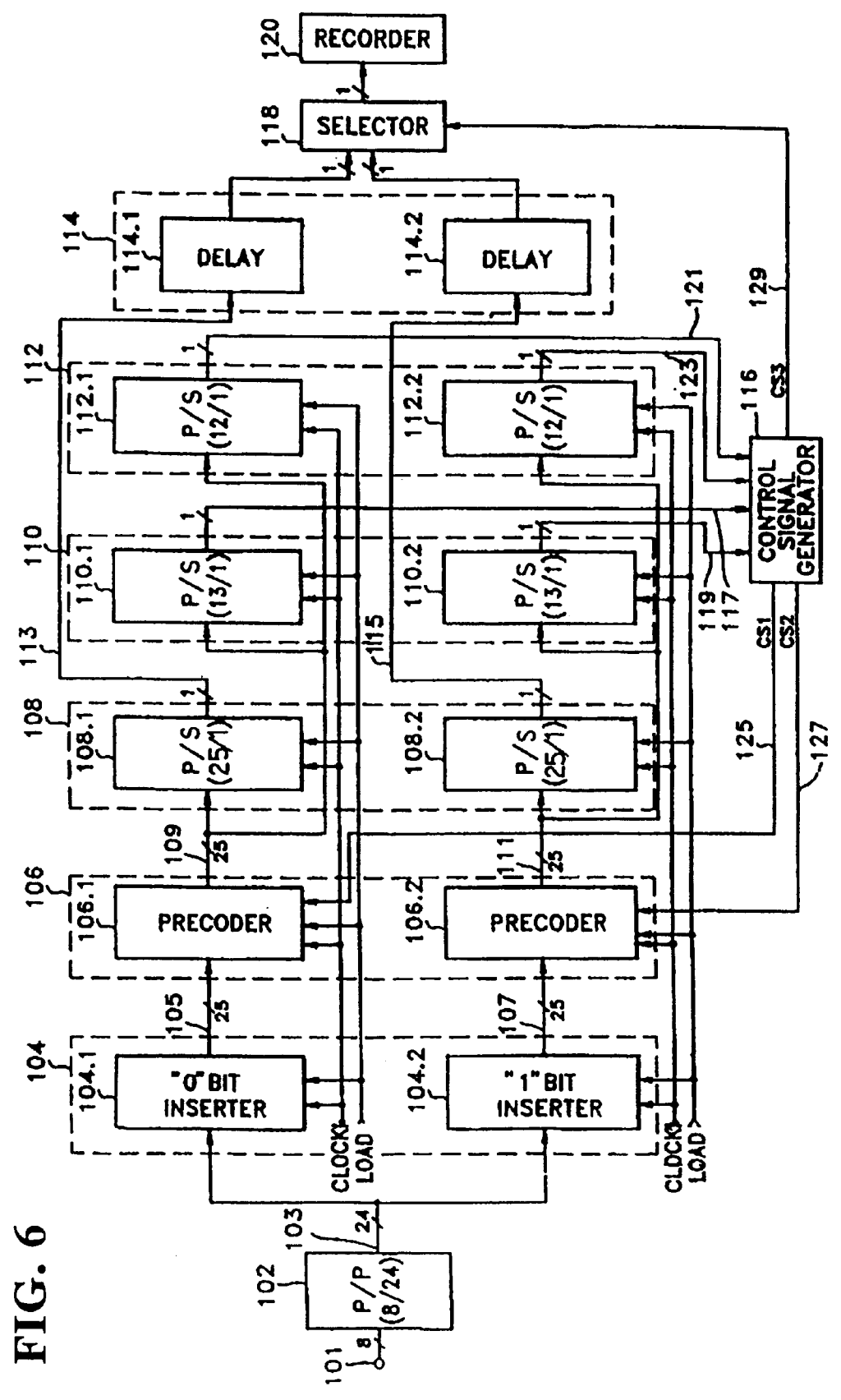

Referring to FIG. 6, an input port 101 for receiving serially supplied 8-parallel-bit words connects to the input port of a parallel-to-parallel (P/P) converter 102. The P/P converter 102 converts each consecutive group of three serial 8-parallel-bit words supplied to its input port into three parallel 8-parallel-bit digital words, i.e., a 24-bit information word, and supplies the converted word in parallel-bit form from its output port 103.

A signal inserting portion 104 affixes a single-bit digital word prefix to each 24-bit information word supplied in parallel-bit form from the output port 103 of the P/P converter 102. The signal inserting portion comprises a "0" bit inserter 104.1 for affixing a "0" bit as prefix to the 24-bit information word, and a "1" bit inserter 104.2 for affixing a "1" bit as prefix to the 24-bit information word.

The thus-obtained 25-bit information words are supplied from output ports 105 and 107 to precoders 106.1 and 106.2, respectively, of an encoding portion 106. For the precoders 106.1 and 106.2, 2T precoders are preferably used to convert a 25-bit information word into a 25-bit channel word. These 2T precoders are suited for processing on a parallel-bit word basis and differ in their construction from those described in U.S. Pat. No. 5,142,421 suited for processing on a serial-bit word basis. The construction of these precoders 106.1 and 106.2, each of which includes 25 exclusive-OR gates, will be described in detail further on in this specification with reference to FIGS. 8 and 10 of the drawing, in which the signal inserting portion 104 is included in the encoding portion 106. Precoding still requires that bits that will be recorded later be determined based upon bits that will be recorded earlier. So time is required during preceding for ripple-through integration of the initialization bits and the successive bits used to form each channel word. However, the time required during precoding for ripple-through integration of these bits is only a fraction of the channel word interval.

The input ports of parallel-to-serial (P/S) converters 108.1 and 108.2 of a first signal converter 108 respectively connect from output ports 109 and 111 of the precoders 106.1 and 106.2; and the output ports of converters 108.1 and 108.2 respectively connect to input ports of delays 114.1 and 114.2 of a time compensator 114. Each of the converters 108.1 and 108.2 converts each 25-parallel-bit channel word supplied thereto into a 25-serial-bit channel word supplied at the bit rate associated with the I-NRZI modulation recorded on the magnetic recording medium.

P/S converters 110.1 and 110.2 of a second signal converter 110 convert to serial-bit form the odd-numbered bit-places of each channel word (hereinafter referred to as an "odd channel" word) from the 25-bit channel words supplied in parallel from the precoders 106.1 and 106.2. P/S converters 112.1 and 112.2 of a third signal converter 112 convert to serial-bit form the even-numbered bit-places of each channel word (hereinafter referred to as an "even channel" word) from the 25-bit channel words supplied in parallel from the precoders 106.1 and 106.2, respectively.

Fixed delays created by delay elements 114.1 and 114.2 of time compensator 114 compensate for the time taken by a control signal generator 116 to generate a control signal indicating to a selector 118 which of the channel words respectively generated by the precoders 106.1 and 106.2 and delayed by the delay elements 114.1 and 114.2 to select to a recording portion 120.

The control signal generator 116 generates first, second and third control signals CS1, CS2 and CS3 on the basis of the channel word signals supplied respectively from the respective output ports 117, 119, 121 and 123 of the P/S converters 110.1, 110.2, 112.1 and 112.2. The circuitry in the control signal generator 116 that decides which of the channel words generated by the precoders 106.1 and 106.2 is to be recorded, processes the odd-channel word supplied from the P/S converter 110.1 and the even-channel word supplied from the P/S converter 112.1 in parallel, and this circuitry also processes the odd-channel word supplied from the P/S converter 110.2 and the even-channel word supplied from the P/S converter 112.2 in parallel. These parallel processing procedures halve the time required to complete the decision procedure, the computations for which are clocked at the same bit rate as the I-NRZI signal that is to be recorded. Accordingly, the computations can be completed in a little over half the time interval between serial-word channel word clocks that occur at one-twenty-fifth the bit rate of the I-NRZI signal that is to be recorded. The time for these computations combined with the time for ripple-through integration in the precoders 106.1 and 106.2 of the encoding portion 106 is sufficiently less than the time interval between channel word clocks, to afford plenty of time to re-initialize integrators within the control signal generator 116 and to set up initialization for ripple-through integration that is to take place when the next serial-word is clocked into the precoders 106.1 and 106.2. The first and second control signals CS1 and CS2 that the control signal generator 116 supplies via its output ports 125 and 127 are applied to the respective control ports of the precoders 106.1 and 106.2. The third control signal CS3 the control signal generator 116 supplies via its output port 127 is applied to the selection control port of the selector 118.

In accordance with the third control signal CS3, the selector 118 selects a value closer to an intended frequency characteristic between the 25-serial-bit "positive"-information channel word supplied by the P/S converter 108.1 and the 25-serial-bit "odd"-information channel word supplied by the P/S converter 108.2, and transmits the selected word to the recording portion 120.

Reductions can be made in the FIG. 6 digital signal recording apparatus. Corresponding bit places of the even channel words supplied in parallel from the precoders 106.1 and 106.2 are identical if they are of 2T type and single-bit prefixes are used, so one of the P/S converters 112.1 and 112.2 can be dispensed with, and the signal supplied from its output port to the control signal generator 116 can be supplied instead from the output port of the remaining one of the converters 112.1 and 112.2. If the precoders 106.1 and 106.2 are of 2T type and single-bit prefixes are used, corresponding bit places of the odd channel words they supply in parallel are bit complements of each other, so one of the P/S converters 110.1 and 110.2 can be dispensed with, and the signal supplied from its output port to the control signal generator 116 can be supplied instead by bit-complementing the signal from the output port of the remaining one of the converters 110.1 and 110.2.

Figure 7:
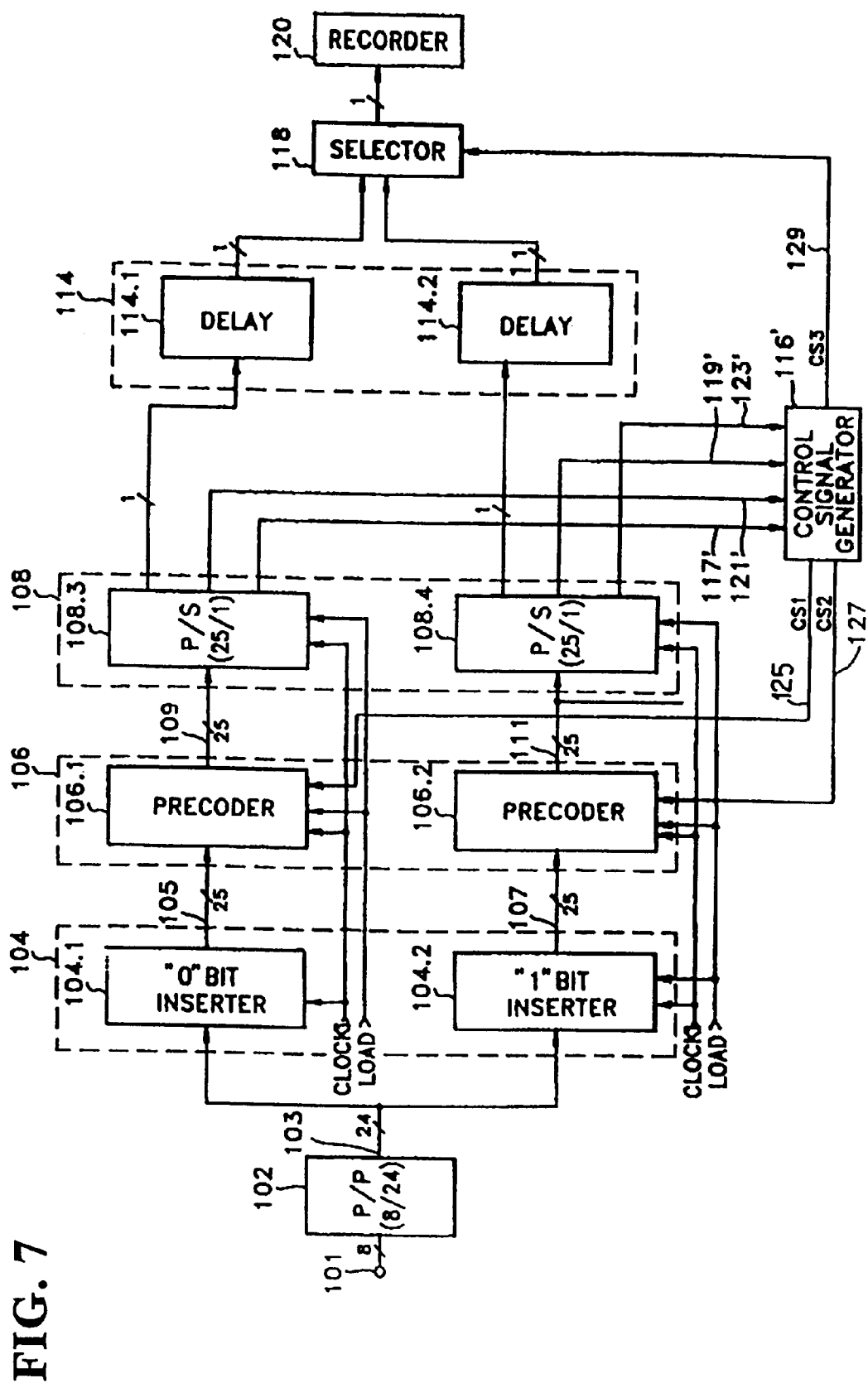
FIG. 7 is a block diagram of other digital signal recording apparatus that embodies the invention.

FIG. 7 is a block diagram of another embodiment of the digital signal recording apparatus of the present invention. In the drawing, the same numerals designate the same components as the apparatus of FIG. 6. Accordingly, configuration and operation that are the same will not be described again. Referring to FIG. 7, output ports 117', 119', 121' and 123' of the first signal converter 108 are coupled directly to the input ports of a modified control signal generator 116', such that the second and third signal converters 110 and 112 of FIG. 6 are eliminated from the circuit.

In the operation of FIG. 7, responsive to the 25-parallel-bit "positive"-information channel word supplied from the precoder 106.1, a P/S converter 108.3 within the first signal converter 108 supplies first through thirteenth bits of the channel word (hereinafter referred to as the "leading bit group") via output port 117' to the control signal generator 116'. At the same time the P/S converter 108.3 supplies the first through twelfth of these bits, it also supplies fourteenth through twenty-fifth bits of the channel word (hereinafter referred to as the "trailing bit group") via output port 121' to the control signal generator 116'.

Responsive to the 25-parallel-bit "negative"-information channel word supplied from precoder 106.2, a P/S converter 108.4 within the first signal converter 108 supplies first through thirteenth bits of the channel word (hereinafter referred to as the "leading bit group") via output port 119' to the control signal generator 116'. During the same time the P/S converter 108.4 also supplies fourteenth through twenty-fifth bits of the channel word (hereinafter referred to as the "trailing bit group") via the output port 123' to the control signal generator 116'.

The modified control signal generator 116' performs the same general calculations as the control signal generator 116, but in somewhat different order, requiring modifications of the FIG. 4 filter circuitry in regard to the triangular wave generator 18, the square wave generator 38 and the sine and cosine signal generators. These modifications are readily made by one of ordinary skill in the art of digital system design. This is particularly so where these generators are implemented using read-only memory (ROM), since the order of the sequential reading of the samples of each of the various system functions is readily permuted.

Figure 8A:
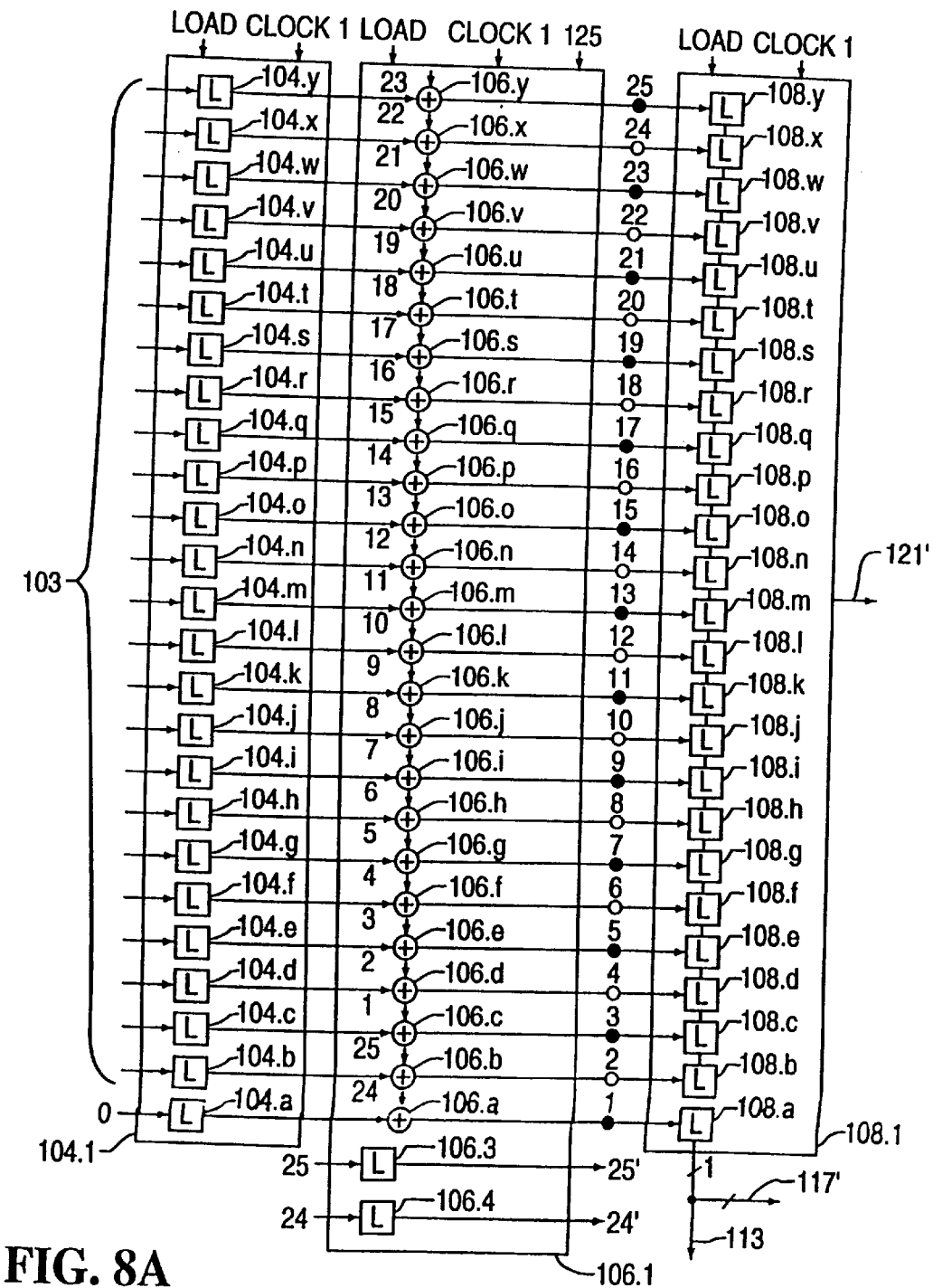
FIG. 8 is a detailed block diagram of a portion of the FIG. 6 digital signal recording apparatus.

FIG. 8 is a detailed block diagram of the "0" bit inserter 104.1, the precoder 106.1 and the P/S converters 108.1, 110.1 and 112.1, each of which is shown in FIG. 6. Referring to FIG. 8, the "0" bit inserter 104.1 is made up of 25 latches 104.a through 104.y. A "0" bit is applied to the latch 104.a which stores the most significant bit, according to a system clock (CLOCK 1) and a load command signal LOAD. The remaining latches 104.b through 104.y receive the 24-bit information word supplied in parallel from the output port 103 of the P/P converter 102.

Figure 9:
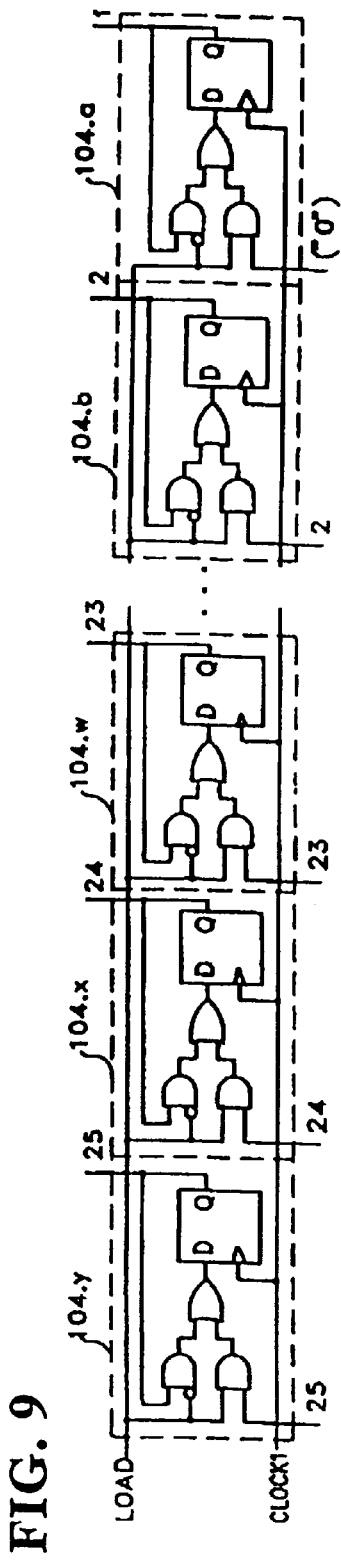
FIG. 9 is a detailed circuit diagram of the "0" bit inserter shown in FIG. 8.

As shown in FIG. 9, which is a detailed circuit diagram of the "0" bit inserter 104.1, each of the 25 latches is made up of one D flip-flop, two AND gates and one OR gate. In the operation of the inserting portion 104.1, when the LOAD command signal is a logic high, a "0" bit applied to the data port of the latch 104.a and the 24-bit information word supplied from the P/P converter 102 are latched and supplied from the Q outputs of the respective D flip-flops. When the LOAD command signal is a logic low, the latches maintain the output of each D flip-flop.

The first input ports of XOR gates 106.a through 106.y of the precoder 106.1 shown in FIG. 8 are respectively coupled to the respective output ports of the latches 104.a through 104.y of the "0" bit inserter 104.1. The second inputs of the XOR gates 106.a and 106.b are tied to the respective outputs of the latches 106.3 and 106.4. The respective outputs of the XOR gates 106.a through 106.w connect to the second inputs of the XOR gates 106.c through 106.y. The outputs of the XOR gates 106.x and 106.y are coupled to the respective inputs of the latches 106.3 and 106.4.

The operation of precoder 106 will be explained below.

The second least significant bit from the preceding channel word and the MSB (here, the inserted "0" bit) of the current 25-bit channel word are supplied to the XOR gate 106.a. The least significant bit (LSB) from the preceding channel word and the second MSB bit (here, the first bit of input data) of the current 25-bit channel word are supplied to the XOR gate 106.b. The output of the XOR gate 106.a and the second bit of the input data are supplied to the XOR gate 106.c. The output of the XOR gate 106.b and the third bit of the input data are supplied to the XOR gate 106.d.

The XOR gates 106.e through 106.y precode the remaining data of the 25-bit channel word in similar manner. The outputs of the XOR gates 106.a through 106.y are the 25-bit channel word (precoded data) supplied in parallel from the precoder 106.1.

Figure 10:
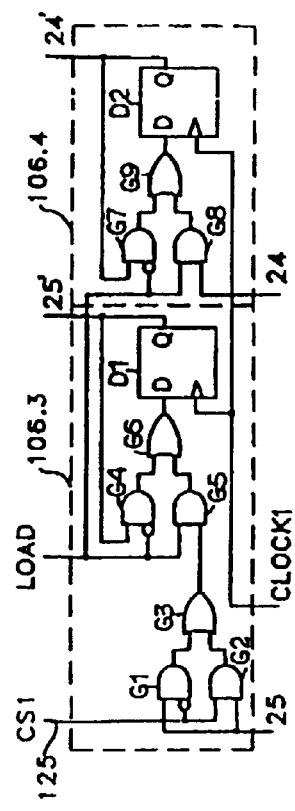
FIG. 10 is a detailed circuit diagram of the 2T precoder shown in FIG. 8.

FIG. 10 is a detailed circuit diagram of the latches 106.3 and 106.4 of the precoder 106.1. Referring to FIG. 10, when the LOAD signal is a logic high, output signal 24 of the XOR gate 106.x supplied to the data port of a D flip-flop D2 via gates G8 and G9 is applied as the second LSB 24' of the preceding channel word, to the second input of the XOR gate 106.a of FIG. 8 according to the system clock (CLOCK 1). Simultaneously, output signal 25 of the XOR gate 106.y applied to the data port of a D flip-flop D1 via gates G2, G3, G5 and G6 is supplied as the LSB 25' of the preceding channel word, to the second input port of the XOR gate 106.b of FIG. 8 according to the system clock signal (CLOCK 1). While the LOAD command signal is low (and until it goes high), the Q outputs of the D flip-flops D1 and D2 are maintained.

Since the output of the D flip-flop D1 is subject to the influence of the first control signal CS1 supplied from the first control signal output port 125 of the control signal generator 116 shown in FIG. 6, if first control signal CS1 is high, the output 25 of the XOR gate 106.y is supplied to the gate G2 without change. If the first control signal CS1 is low, the output of the XOR gate 106.y is complemented.

For instance, when the output 25 of the XOR gate 106.y is a logic high and the first control signal CS1 is a logic low, the output of the D flip-flop D1 is low. If the first control signal CS1 and the output 25 are both high, the output of the D flip-flop D1 is high.

If the first control signal CS1 is a logic high, which indicates that the "positive"-information channel word is selected, the initial value of the latch 106.3 of the precoder 106.1 stays unchanged. If the control signal CS1 is a logic low, which indicates that the "negative"-information channel word is selected, the initial value of the latch 106.3 of the precoder 106.1 is complemented.

Figure 11:
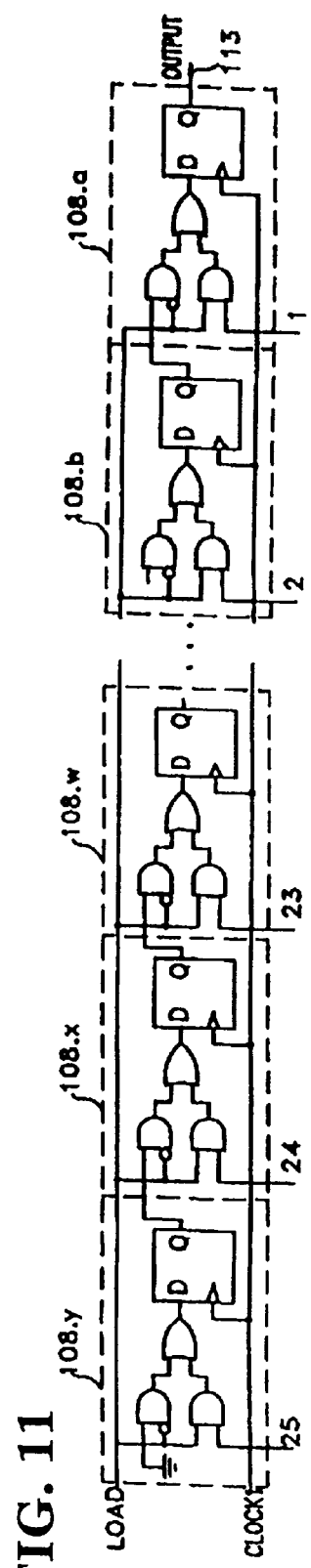
FIG. 11 is a detailed circuit diagram of a parallel-to-serial converter shown in FIG. 8.

P/S converter 108.1 of FIG. 8 receives the respective outputs of the XOR gates 106.a through 106.y in parallel according to the system clock and LOAD command signal, thereby supplying the received outputs as a serial 25-bit channel word. FIG. 8 shows the P/S converter 108.1 is composed of 25 latches 108.a through 108.y, which FIG. 11 shows in detail. FIG. 11 shows each latch being made up of two AND gates, an OR gate and a D flip-flop.

When the LOAD command signal is a logic high, the D flip-flops each receive the output of a corresponding XOR gate of the precoder 106.1 and supply it as the input of the first AND gate of the latch of the next higher bit. If the LOAD command signal is a logic low, each D flip-flop holds its Q output until the LOAD command signal goes high. As the final output, a serial 25-bit channel word is supplied from the output port 113.

The P/S converter 108.3 of FIG. 7 has the same configuration as that of the P/S converter 108.1 of FIG. 11. However, the difference is that output port 117' of the latch 108.a and the output port 121' of the latch 108.n are coupled to the control signal generator 116.

The P/S converter 110.1 of FIG. 8 is composed of thirteen latches 110.a, 110.c, . . . , and 110.y. Their configuration is the same as that of the respective latches of the P/S converter 108.1 shown in FIG. 11. Responsive to the LOAD command signal and clock signal simultaneously occurring, odd channel words are selected from the 25-bit channel word (supplied in parallel from the precoder 106.1) to be loaded in parallel into these thirteen latches 110.a, 110.c, . . . , and 110.y, so that a 13-bit odd channel word is supplied serially from the output port 117 of the latch 110.a.

The P/S converter 112.1 of FIG. 8 has 12 latches 112.b, 112.d, . . . , and 112.x. Their configuration is the same as that of the latches of the P/S converter 108.1 shown in FIG. 11.

Responsive to the LOAD command signal and clock signal simultaneously occurring, even channel words are selected from the 25-bit channel word (supplied in parallel from the precoder 106.1) to be loaded in parallel into these 12 latches 112.b, 112.d, . . . , and 112.x, so that a 12-bit even channel word is supplied serially from the output port 121 of the latch 112.a.

Figure 12:
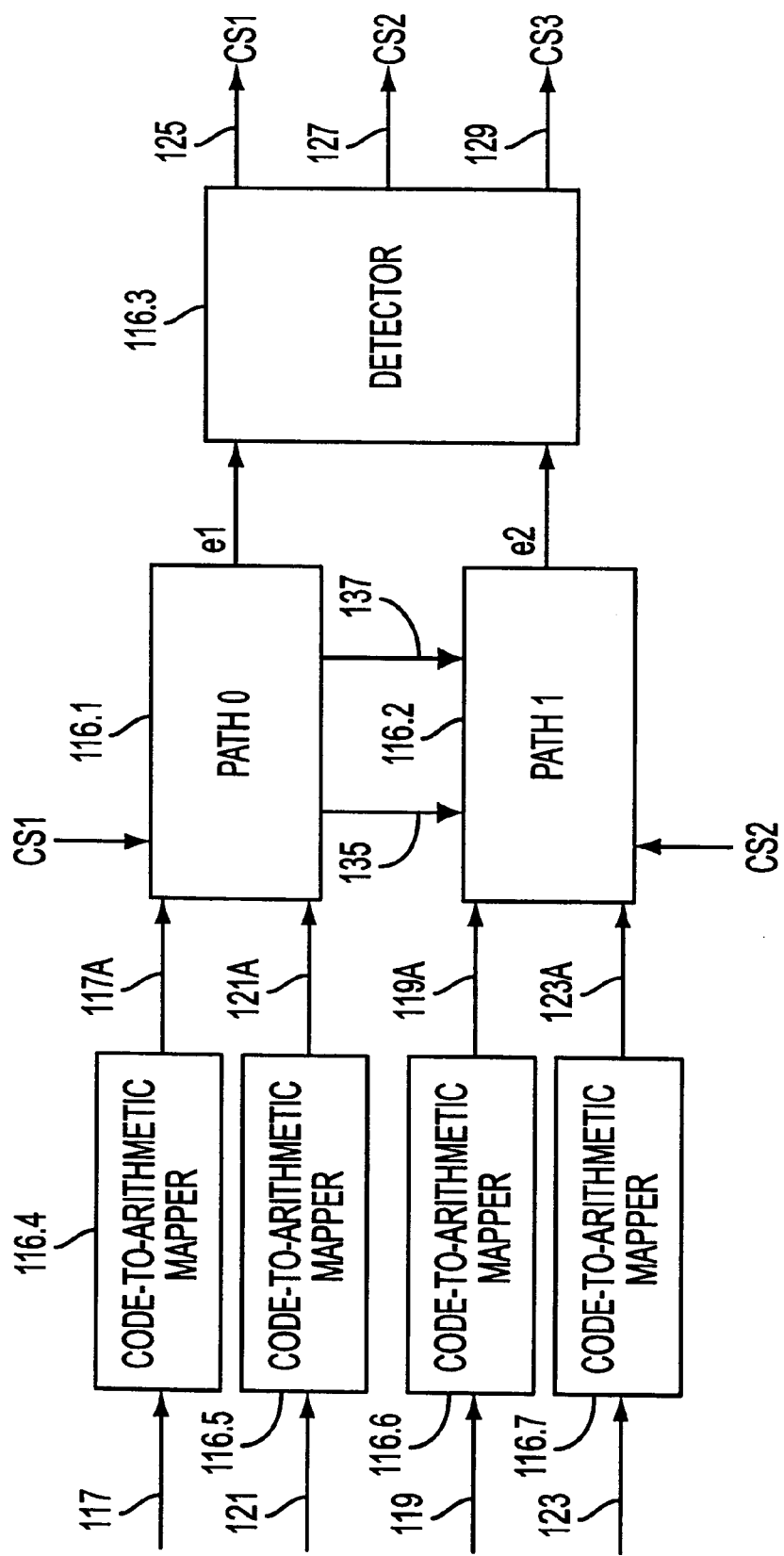
FIG. 12 is a block diagram of the control signal generator used in the FIG. 6 digital signal recording apparatus.

FIG. 12 is a block diagram of the control signal generator 116 shown in FIG. 6, which includes a PATH0 unit 116.1, a PATH1 unit 116.2, a detector 116.3, and code-to-arithmetic mappers 116.4–116.7. The code-to-arithmetic mapper 116.4 converts the ONEs and ZEROs supplied from the output port 117 of the P/S converter 110.1 of FIG. 6 to arithmetic descriptions of NRZI modulation that switches between negative and positive arithmetic values of similar amplitude and is unaccompanied by a direct term, which arithmetic descriptions are supplied from the output port 117' of the code-to-arithmetic mapper 116.4. A code-to-arithmetic mapper 116.5 converts the ONEs and ZEROs supplied from the output port 121 of the P/S converter 110.1 of FIG. 6 to arithmetic descriptions of NRZI modulation that switches between negative and positive arithmetic values of similar amplitude and is unaccompanied by a direct term, which arithmetic descriptions are supplied from the output port 121' of the code-to-arithmetic mapper 116.5. A code-to-arithmetic mapper 116.6 converts the ONEs and ZEROs supplied from the output port 119 of the P/S converter 110.2 of FIG. 6 to arithmetic descriptions of NRZI modulation that switches between negative and positive arithmetic values of similar amplitude and is unaccompanied by a direct term, which arithmetic descriptions are supplied from the output port 119' of the code-to-arithmetic mapper 116.6. A code-to-arithmetic mapper 116.7 converts the ONEs and ZEROs supplied from the output port 123 of the P/S converter 110.2 of FIG. 6 to arithmetic descriptions of NRZI modulation that switches between negative and positive arithmetic values of similar amplitude and is unaccompanied by a direct term, which arithmetic descriptions are supplied from the output port 123' of the code-to-arithmetic mapper 116.6.

The first and second input ports of a PATH0 unit 116.1 connect to the respective output ports 117' and 121' of the code-to-arithmetic mappers 116.4 and 116.5. Preset signal output port 137 of a PATH1 unit 116.2 is connected to the preset input port of the PATH0 unit 116.1. The output port of the PATH0 unit 116.1 for supplying error signal e1 is coupled to the first input port of the detector 116.3. The first and second input ports of PATH1 unit 116.2 connect to the respective output ports 119' and 123' of the code-to-arithmetic mappers 116.6 and 116.7. Preset signal output port 135 of the PATH0 unit 116.1 is connected to the preset input of the PATH1 unit 116.2. The output port of the PATH1 unit 116.2 for supplying error signal e2 is coupled to the second input port of the detector 116.3. The first and second control signal output ports 125 and 127 of the detector 116.3 are connected to the respective control ports of the precoders 106.1 and 106.2 of FIG. 6 and to the respective control ports of units 116.1 and 116.2. Third control signal output port 129 is coupled to the selection control port of the selector 118.

Figure 13:
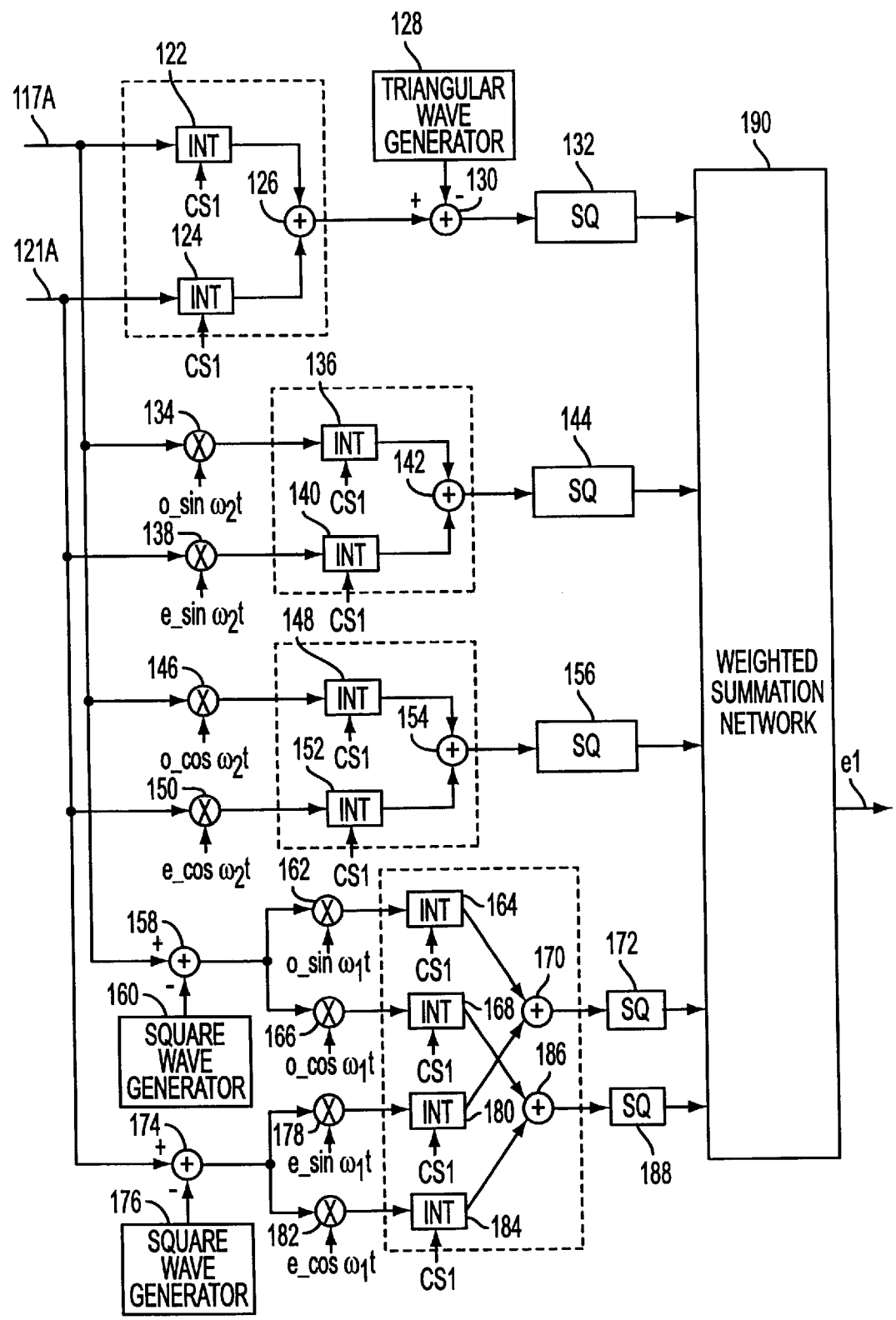
FIG. 13 is a detailed circuit diagram of PATH0 in a portion of the control signal generator shown in FIG. 12.

FIG. 13 is a detailed circuit diagram of the PATH0 unit 116.1 of the control signal generator shown in FIG. 12. The first and second input ports of the PATH0 unit 116.1 connect to respective output ports 117' and 121' of the code-to-arithmetic mappers 116.4 and 116.5 of FIG. 12 to receive two's complement numbers descriptive of I-NRZI modulation that are used as input signal by arithmetic elements 122, 124, 134, 138, 146, 150, 158 and 174. The unit 116.1 is composed of the integration circuits 122, 124 through a squaring circuit 132 for forming a pilot signal at an intended frequency (here, $f_1$) on the frequency spectrum of the 25-bit serial data stream while at the same time forming a notch at zero frequency, the multipliers 134, 138 through a squaring circuit 156 for forming a notch at an intended frequency (here, $f_2$), the subtractors 158, 174 through a squaring circuit 188 for forming dips on the skirts of the pilot signal ($f_1$), and a weighted summation network 190 for summing the outputs of squaring circuits 132, 144, 156, 172 and 188, thereby generating error signal e1.

The odd channel word input from the output port 117' and the even channel word input from the output port 121' are added to a value (the digital sum value of the preceding 25-bit channel word) prestored in respective integration circuits 122 and 124. The respective outputs of the integration circuits 122 and 124 are summed in an adder 126 and then supplied to the first input port of the subtractor 130.

Figure 14A:
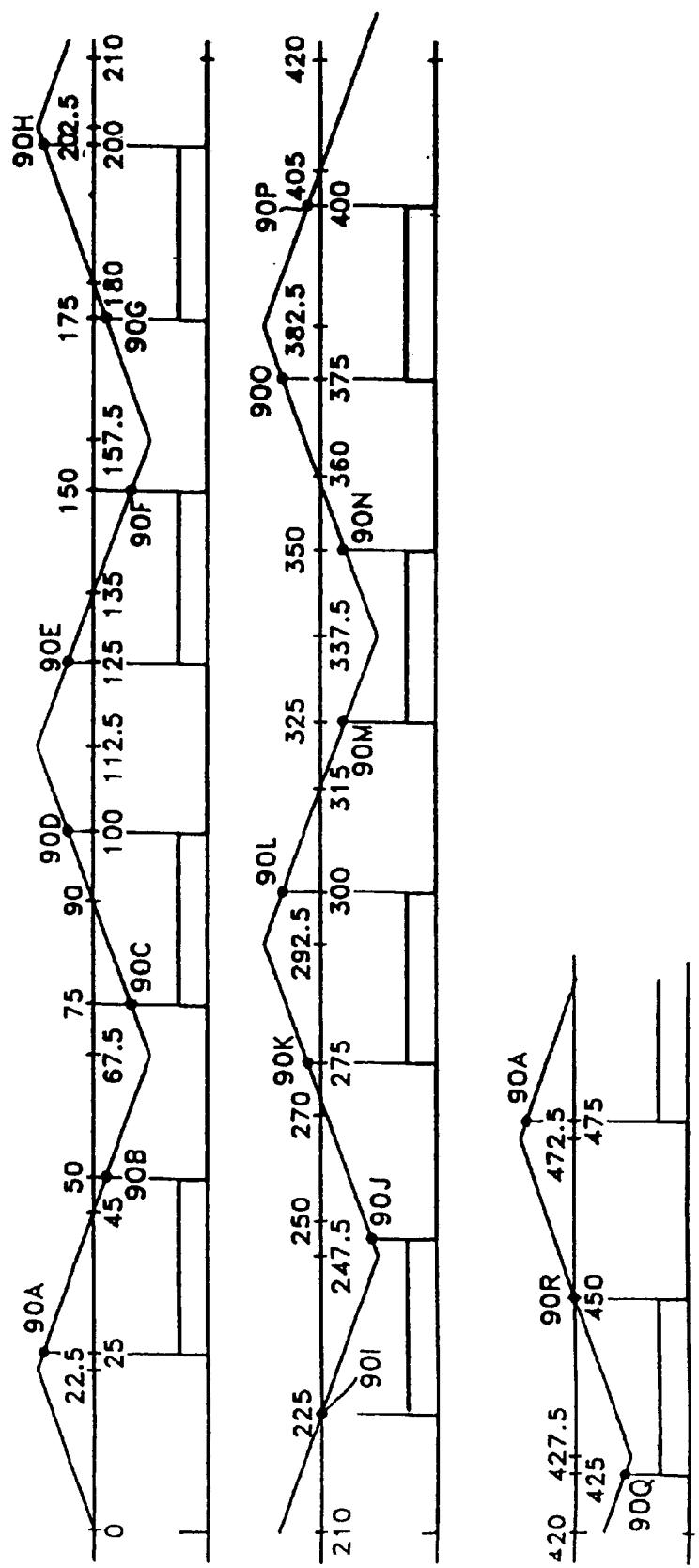
FIG. 14A illustrates the waveform of a signal generated from the triangular wave generator shown in FIG. 13.

A triangular wave generator 128 is made up of a ROM and generates a triangular wave signal corresponding to the digital sum value (DSV) of the serial data stream of channel words being descriptive of a prescribed frequency (here, $f_1$), corresponding to the fundamental frequency component of the triangular wave signal. If the signal generated from the ROM is a triangular wave of frequency $f_1$ (for instance, 1/90T) as shown in FIG. 14A, 8-bit data (for instance, 90A through 90L) is stored using 5-bit addresses which are indicative of values zero through sixteen in the ROM table shown in FIG. 14B. The subtractor 130 subtracts the output of the triangular wave generator 128 from the output of the adder 126. The difference value is squared in the squaring circuit 132 and applied to the weighted summation network 190. The triangular wave generator 128 and the subtractor 130 provide detection circuitry for detecting any deviation from the prescribed digital sum needed for maintaining the desired pilot signal, of the digital sum value that the adder 126 supplies; and the squaring circuit 132 computes the energy of that deviation. These computations are to implement a notch being formed at f=0 Hz (in other words, the DC component) and a pilot signal being formed at frequency $f_1$.

Computations are also made to implement the introduction of a notch at frequency $f_2(\omega_2/2\pi)$ by generating summand input signals for application to the weighted summation network 190 whenever there is energy at the frequency in the spectrum of the "positive"-information channel word supplied by the precoder 106.1. This is done as follows.

A multiplier 134 multiplies the odd channel words by odd sine signal o__$\sin\omega_2 t$, and the resulting product is integrated in an integration circuit 136. A multiplier 138 multiplies the even channel words by even sine signal e__$\sin\omega_2 t$, and the resulting product is integrated in an integration circuit 140. The integration results from the integration circuits 136 and 140 are added in an adder 142. The resulting sum is squared in the squaring circuit 144, and the resulting square is applied to the weighted summation network 190.

A multiplier 146 multiplies the odd channel words by odd cosine signal o__$\cos\omega_2 t$, and the resulting product is integrated in an integration circuit 148. The even channel words and even cosine signal e__$\cos\omega_2 t$ are multiplied together in a multiplier 150, and the resulting product is integrated in an integration circuit 152. An adder 154 sums the integration results from the integration circuits 148 and 152. The summed value is squared by the squaring circuit 156 and the resulting square is supplied as a summand to the weighted summation network 190.

Figures 15A, 15B, 15C:
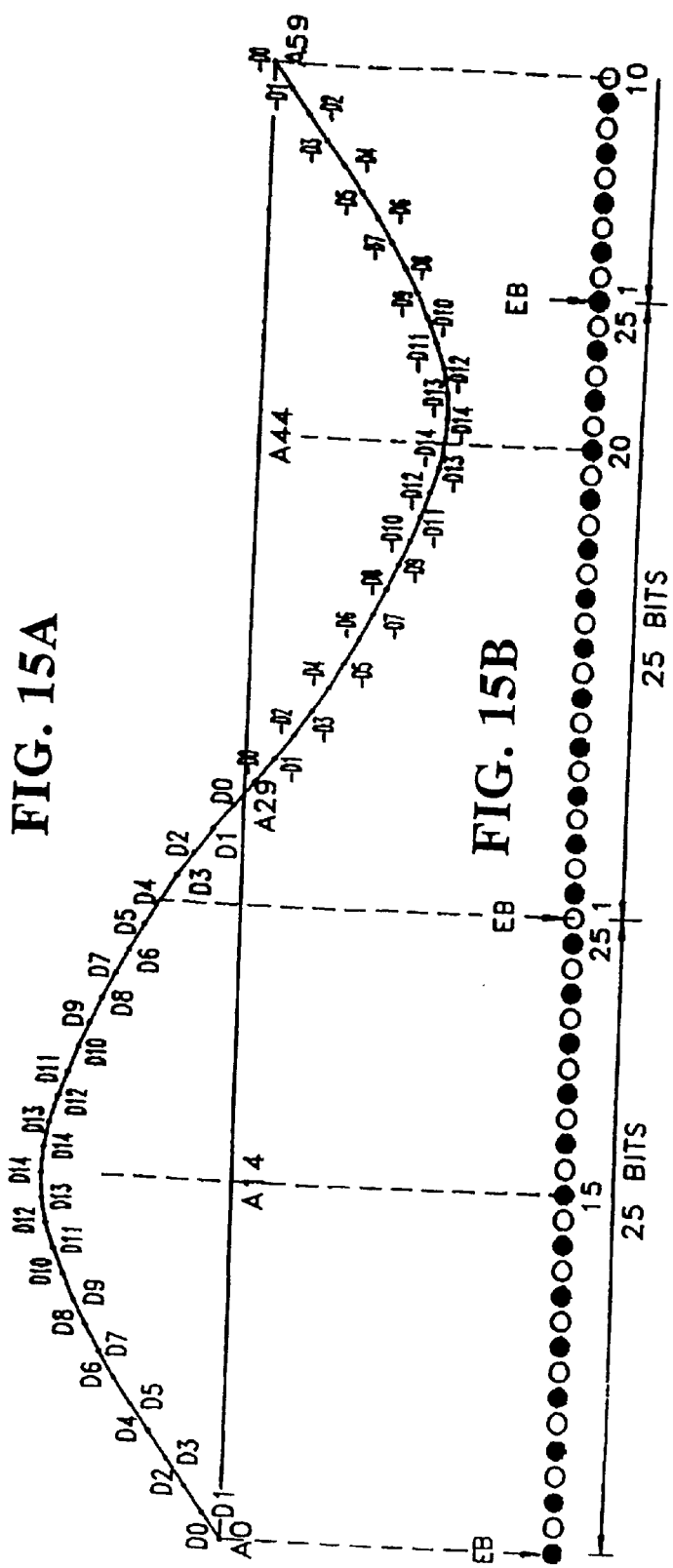
FIGS. 15A, 15B and 15C illustrate the sine-wave and square-wave signals used in FIG. 13.

A ROM (not shown) generates a sine signal input for application to the multipliers 134 and 138. The sine table stored in the ROM is divided into an odd-sample sine table and an even-sample sine table. If the waveform of the sine signal is, for instance, 1/60T for frequency $f_2$, as shown in FIG. 15A, one period of the sine signal is divided into sixty addresses, and data corresponding to the amplitude of a sampled sine signal is stored in each address of the sine table. Data corresponding to the odd addresses of the sampled sine signal is stored in the odd-sample sine table. The even-sample sine table stores data corresponding to the even addresses of the sampled sine signal. As shown in FIG. 15B, the points corresponding to bits (indicated by dots) become alternately odd addresses or even addresses of the sine signal sampled by the period of 25-bit channel word. In the drawing, the characters EB (extra bit) indicate where a "0" bit is inserted, that is, the MSB. Similarly, the cosine signal supplied to the multipliers 146 and 150 may be generated by a ROM having an odd-sample cosine table and an even-sample cosine table. When the sine signal and cosine signal are designed to be generated by a single ROM, an address shifted by 45° with respect to the sine signal is applied and a corresponding value (the cosine) is read out.

A dip is also introduced in portions of the frequency spectrum flanking the frequency $f_1=(\omega_1/2\pi)$ by generating summand input signals for application to the weighted summation network 190 whenever there is energy in those portions of the frequency spectrum of the "positive"-information channel word supplied by the precoder 106.1. This is done as follows.

A subtractor 158 subtracts, from the odd channel words, the odd samples of a sampled square wave signal (FIG. 15C) generated by a square wave generator 160. The square wave generator 160 and the subtractor 158 provide detection circuitry for detecting any deviation from the prescribed square wave of the "positive"-information serial-bit odd channel word that the P/S converter 110.1 supplies, as converted to arithmetic form by the code-to-arithmetic mapper 116.4. A multiplier 162 multiplies the output of the subtractor 158 by odd sine signal o_sin$\omega_1$t, and the resulting product is integrated in an integration circuit 164. A multiplier 166 multiplies the output of the subtractor 158 by odd cosine signal o_cos$\omega_1$t, and the resulting product is integrated in an integration circuit 168.

A subtractor 174 subtracts, from the even channel words, even samples of a sampled square wave signal generated by the square wave generator 176. The square wave generator 176 and the subtractor 174 provide detection circuitry for detecting any deviation from the prescribed square wave of the "positive"-information serial-bit odd channel word that the P/S converter 112.1 supplies, as converted to arithmetic form by the code-to-arithmetic mapper 116.5. A multiplier 178 multiplies the output of the subtractor 174 by even-sample sine signal o_sin$\omega_1$t, and the resulting product is integrated in an integration circuit 180. A multiplier 182 multiplies the output of the subtractor 174 by even-sample cosine signal o_cos$\omega_1$t, and the resulting product is integrated in an integration circuit 184.

An adder 170 sums the respective outputs of the integration circuits 164 and 180; the resulting sum is squared by the squaring circuit 172; and the squared result is applied to the weighted summation network 190. An adder 186 sums the respective outputs of the integration circuits 168 and 184; the resulting sum is squared by the squaring circuit 188; and the squared result is supplied to the weighted summation network 190. Then, the weighted summation network 190 sums the outputs of the squaring circuits 132, 144, 156, 172 and 188, thereby generating error signal e1.

The operation shown in FIG. 13 is similarly performed in PATH1 unit 116.2 of FIG. 12. The difference is that the control signal input to the respective integration circuits (not shown) of unit 116.2 is second control signal CS2, and that error signal e2 is generated from a weighted summation network (not shown) of unit 116.2. When the precoders 106.1 and 106.2 are of 2T type, certain of the computations carried out in PATH0 and in PATH1 before integration procedures are similar in nature, permitting some sharing of hardware, if desired. The error signal e1 is indicative of how much the DSV in the serial data stream formed by next selecting the "positive"-information word deviates from a prescribed DSV; and the error signal e2 is indicative of how much the DSV in the serial data stream formed by next selecting the "negative"-information word deviates from that prescribed DSV. If the error signal e1 is smaller than the error signal e2, the "positive"-information word from the precoder 106.1 will be selected for recording. If the error signal e2 is smaller than the error signal e1, the "negative"-information word from the precoder 106.2 will be selected for recording. If the error signals e1 and e2 are alike, it is preferable to record the "positive"-information word from the precoder 106.1.

The detector 116.3 of FIG. 12 includes a comparator which selects the smaller value between error signals e1 and e2 and supplies the third control signal CS3. The comparator is typically formed as a two's complement subtractor receptive of error signals e1 and e2 with "0" bit sign extensions as minuend and subtrahend, the sign bit of the resulting difference being used as the third control signal CS3. The third control signal CS3 determines which of the first and second control signals CS1 and CS2 will be generated at a time close to the end of the channel word interval.

According to first and second control signals CS1 and CS2 generated from the detector 116.3 of FIG. 12, that is, when first control signal CS1 is high and second control signal CS2 is low, PATH0 having error signal e1 is selected so that the values of the respective integration circuits of PATH1 are replaced with the values stored in the respective integration circuits 122, 124, 136, 140, 148, 152, 164, 168, 182, and 184 corresponding to PATH0 shown in FIG. 13 via preset output port 131.

FIGS. 16A–16G are operation waveform diagrams of blocks shown in FIG. 6.

FIG. 16A illustrates the output waveform of the P/S converter 108.1 of the first converter 108 for converting the "positive"-information 25-parallel-bit channel word supplied from the encoding portion 106 into a 25-serial-bit channel word according to the system clock (CLOCK 1) shown in FIG. 16D. FIG. 16B illustrates the output waveform of the P/S converter 110.1 of the second converter 110 for receiving the "positive"-information 25-parallel-bit channel word from the encoding portion 106 and serially supplying only the odd channel words selected therefrom, as clocked in accordance with the system clock (FIG. 16D). FIG. 16C illustrates the output waveform of the P/S converter 112.1 of the third converter 112 for receiving the "positive"-information 25-parallel-bit channel word from the encoding portion 106 and serially supplying only the even channel words selected therefrom, as clocked in accordance with the system clock FIGS. 16E, 16F and 16G illustrate first, second and third control signals CS1, CS2 and CS3 generated by the control signal generator 116.

The first and second control signals CS1 and CS2 are alternately high at the ends of cycles of 25 bits length. The first and second control signals CS1 and CS2 are respectively supplied to the first precoder 106.1 and to the second precoder 106.2. The third control signal CS3 is supplied to the selector 118. If the third control signal CS3 is high, the selector 118 selects the output of the P/S converter 108.1 as delayed by the delay 114.1 throughout the ensuing cycle of 25 bits length. If the third control signal CS3 is low, the selector 118 selects the output of the P/S converter 108.2 as delayed by the delay 114.2 throughout the ensuing cycle of 25 bits length.

Therefore, if the data is time-share-multiplexed into the odd channel words and even channel words shown in FIGS. 16B and 16C, although delayed by the integration circuits, multipliers and squaring circuits of the control signal generator shown in FIG. 13, a reduction of at least twelve system clocks is provided for in the time required to compute a control signal, compared to the period of 25 system clocks per channel word. If the data is time-share-multiplexed into leading and trailing bit groups, a similar reduction is possible in the time required to compute a control signal. This enables a control signal to be generated in real time for selecting one output, that is, the one having the intended spectral characteristics, from between those supplied from the P/S converters 108.1 and 108.2.

Figure 17:
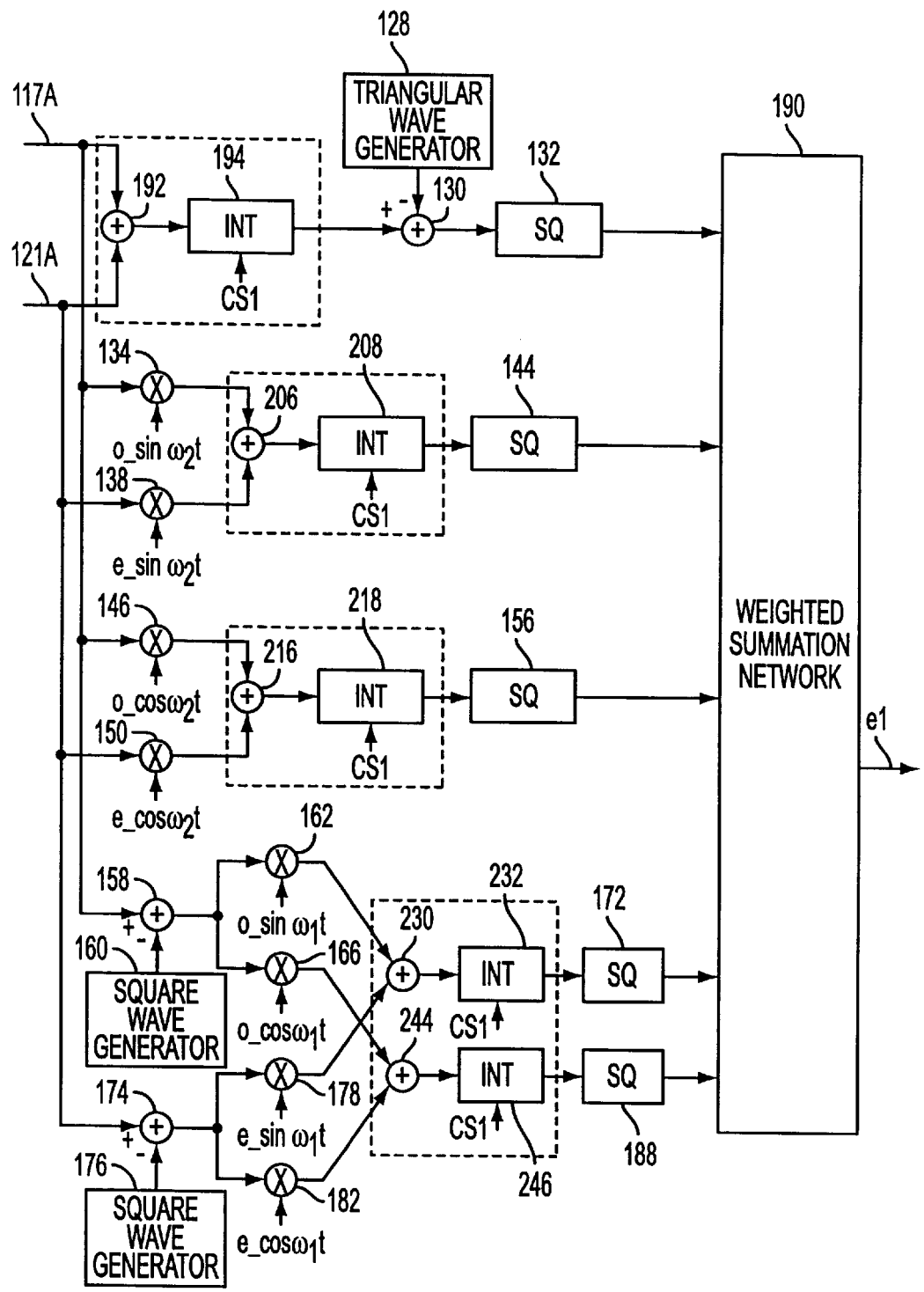
FIG. 17 is a detailed circuit diagram of PATH0 in a portion of the control signal generator shown in FIG. 6 constructed in a way alternative to that shown in FIG. 13.

FIG. 17 is another detailed circuit diagram of PATH0 shown in FIG. 12, showing reductions that can be made in the FIG. 13 PATH0 circuit. The two integration circuits 122 and 124 and the single adder 126 surrounded by a dashed line in FIG. 13 are replaced in FIG. 17 by a simpler, equivalent circuit made up of a single adder 192 and a single integration circuit 194. The two integration circuits 136 and 140 and the single adder 142 surrounded by a dashed line in FIG. 13 are replaced in FIG. 17 by a simpler, equivalent circuit made up of a single adder 206 and a single integration circuit 208. The two integration circuits 148 and 152 and the single adder 154 surrounded by a dashed line in FIG. 13 are replaced in FIG. 17 by a simpler, equivalent circuit made up of a single adder 216 and a single integration circuit 218. The two integration circuits 164 and 180 and the single adder 170 surrounded by a dashed line in FIG. 13 are replaced in FIG. 17 by a simpler, equivalent circuit made up of a single adder 230 and a single integration circuit 232. And the two integration circuits 168 and 184 and the single adder 186 surrounded by the same dashed line in FIG. 13 are replaced in FIG. 17 by a simpler, equivalent circuit made up of a single adder 244 and a single integration circuit 246. When the precoders 106.1 and 106.2 are of 2T type, certain of the computations carried out in PATH0 and in PATH1 before integration procedures are similar in nature, permitting some sharing of hardware, if desired.

Figure 18:
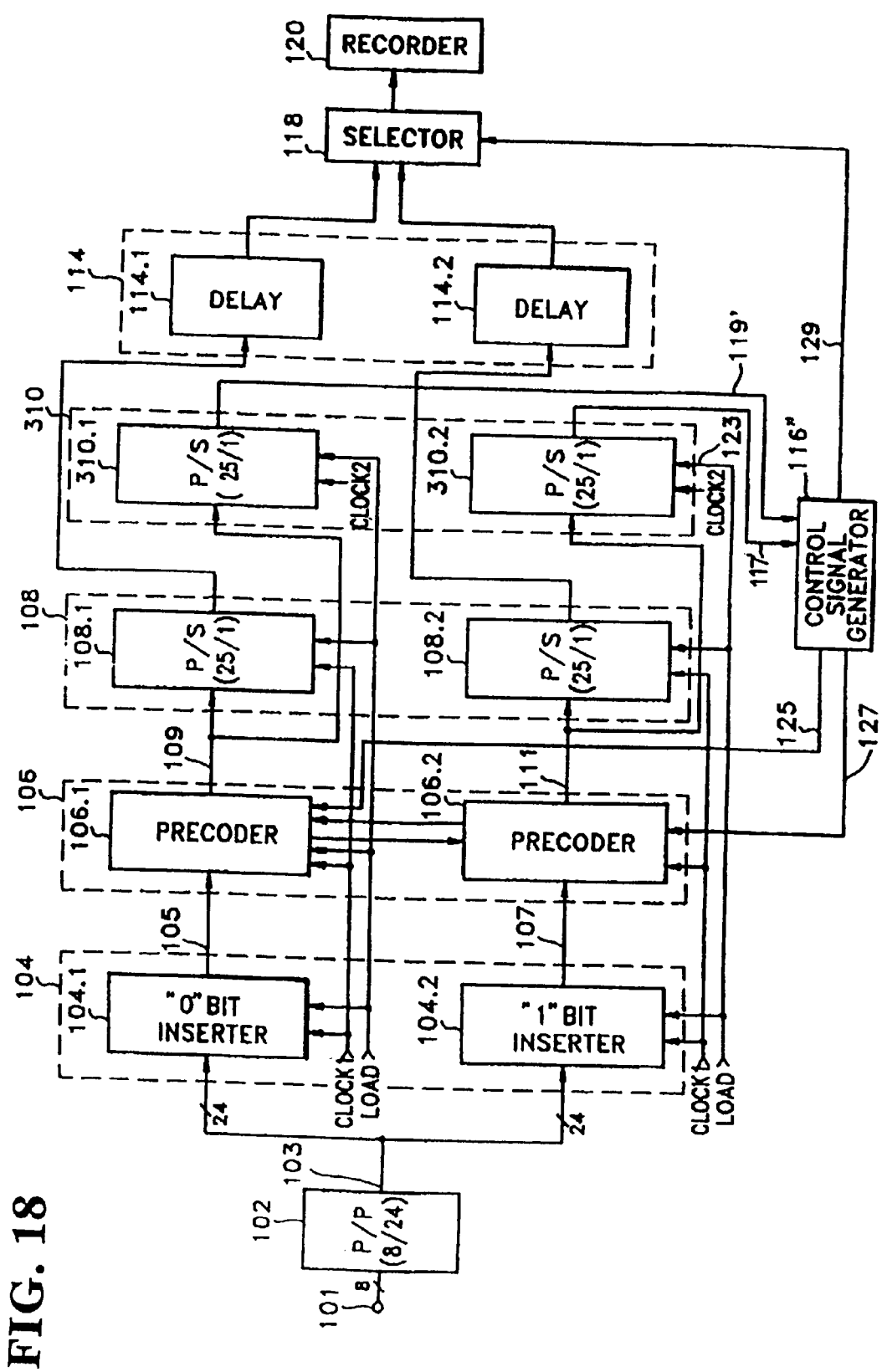
FIG. 18 is a block diagram of still other digital signal recording apparatus that embodies the invention.

FIG. 18 shows another digital signal recording apparatus embodying the invention in which the parallel-bit words serially supplied from the precoders are converted to serial-bit format with a bit rate that is a multiple of the bit rate used during digital recording. Components that are the same as those used in FIG. 6 are numbered with the same numerals, and description of their operation will not be repeated.

The configuration of FIG. 18 is the same as that of FIG. 6, except for a second converter 310 for converting the 25-bit channel word supplied in parallel from the encoding portion 106 into a serial 25-bit channel word according to a second clock (CLOCK 2) of twice the frequency of the system clock signal (CLOCK 1). The second converter 310 replaces both the second converter 110 for converting the odd channel words from the 25-parallel-bit channel word supplied from the encoding portion 106 of FIG. 6 into a serial-bit channel word and the third converter 112 for converting the even channel words from the 25-parallel-bit channel word supplied from the encoding portion 106 into a serial-bit channel word.

The operation of FIG. 18 will be explained with reference to FIGS. 19A through 19D.

In FIG. 18, the detailed configuration and operation of the P/P converter 102, the signal inserting portion 104, the encoding portion 106, and the first converter 108 are the same as those in FIGS. 8 through 11.

FIG. 19A illustrates the output waveform of the P/S converter 108.1 of the first P/S converter 108, which converts the 25-parallel-bit "positive"-information channel word (as supplied from the precoder 106.1) into a 25-serial-bit "positive"-information channel word.

FIG. 19B shows the first clock signal (CLOCK 1), in accordance with which the serial-bit signals from the first converter 108 are clocked.

FIG. 19C illustrates the output waveform of the P/S converter 310.1 of the second converter 310 for converting the 25-parallel-bit "positive"-information channel word (as supplied from the precoder 106.1) into a 25-serial-bit channel word supplied at a bit rate twice as high as the 25-serial-bit channel word supplied from the P/S converter 108.1.

FIG. 19D shows the second clock signal (CLOCK 2), in accordance with which the serial-bit signals from the second converter 310 are clocked.

In the FIG. 18 digital signal recording apparatus, the control signal generator 116" receives the output of the second converter 310 which is time-compressed twofold in accordance with the second clock signal and thereby corresponds to half the original period of the 25-parallel-bit channel word. The comparison between the respective frequency components of the time-compressed "positive"-information 25-serial-bit channel words and of the time-compressed "negative"-information 25-serial-bit channel words supplied in parallel is carried out well within one 25-parallel-bit channel-word interval, despite delay introduced into the computations by the integration circuits, multipliers and squaring circuits of the control signal generator 116" similar to those shown in FIG. 13 or 17. Accordingly, a control signal for selecting a 25-parallel-bit channel word for an intended channel can be generated without having to depart from pipeline processing of channel words. Twofold time compression is generally sufficient and is preferred, because of the ease with which the clock signals with rates in 2:1 ratio can be generated using simple counter circuitry, and because doubling of the clocking rate does not tend to require an excessively high clock rate.

Other alternative embodiments of the invention, in addition to those thusfar described, will be apparent to one skilled in the art of digital tape recorder design and acquainted with the foregoing specification; and such alternative embodiments are intended to be considered as being within the scope of the claims appended to this specification. By way of specific example, the time compensator 114 after the first converter 108 used to delay the output signals from the precoders 106.1 and 106.2 as applied to the selector 118 not only can be fixed delay owing to the invention, but in certain designs of the sort shown in FIG. 6 time compensation can be obtained at least in part by delaying the latching of channel words from the 2T precoders 106.1 and 106.2 into the P/S converters 108.1 and 108.2. By way of further specific example, in other embodiments of the invention the delays of the output signals from the precoders 106.1 and 106.2 as applied to the selector 118 are introduced before the first converter 108 (e. g., by respective word latches), rather than being provided after the first converter 108. In yet other embodiments of the invention, the selection between the output signals from the precoders 106.1 and 106.2 is performed while the signals are still in 25-parallel-bit format, and conversion to serial-bit format for recording is deferred until after the selection between channel words is completed.

The triangular wave generator 128 of FIG. 13 can be replaced by a triangular wave generator generating a triangular wave complementary to that generated by the generator 128, and the subtractor 130 replaced by an adder, without changing operation. The square wave generators 160 and 176 of FIG. 13 can be replaced by square wave generators generating square waves complementary to those generated by the generators 160 and 176, and the subtractors 158 and 174 replaced by respective adders, without changing operation. Analogous modifications can be made in the portions of the control signal generators shown in FIGS. 4 and 17.

Methods of estimating the energies of deviations from their absolute values, rather than squaring the deviations, are known to digital designers, and circuitry using such methods are equivalents of the squaring circuitry shown in FIGS. 13 and 17. Embodiments of the invention wherein the precoders 106.1 and 106.2 are of an aT type where a is three or is a still higher integer are also envisioned.

What is claimed is:

1. Digital signal recording apparatus comprising:
    a recorder, for recording parallel tracks of digital signal modulation on a recording medium;
    an input port for serially receiving n-bit information words;
    circuitry for inserting a "0" bit into each said received n-bit information word and generating a (n+1)-parallel-bit "positive" information word at an information word rate slower by a factor of (n+1) than the rate of a system clock;
    circuitry for inserting a "1" bit into each said received n-bit information word and generating a (n+1)-parallel-bit "negative" information word at said information word rate, which (n+1)-parallel-bit "negative" information word is supplied concurrently with said (n+1)-parallel-bit "positive" information word generated from the same one of said n-bit information words;
    a first precoder for coding each (n+1)-parallel-bit "positive" information word to convert it into a corresponding "positive"-information (n+1)-parallel-bit channel word, generated at a channel word rate slower by a factor of (n+1) than the rate of said system clock;
    a second precoder for coding each (n+1)-parallel-bit "negative" information word to convert it into a corresponding "negative"-information (n+1)-parallel-bit channel word, generated at said channel word rate;
    means for selecting one of each concurrent pair of "positive"-information and "negative"-information (n+1)-parallel-bit channel words for serial recording at said system clock rate, said means for selecting one of each concurrent pair of (n+1)-parallel-bit channel words for recording including
    first parallel-to-serial conversion means for generating first parallel-to-serial conversion results by converting the selected (n+1)-parallel-bit channel word to serial-bit form, and
    a selector switch responsive to a control signal for selecting one of said first parallel-to-serial conversion results for application to said recorder, for serial recording at said system clock rate;
    second parallel-to-serial conversion means for generating second parallel-to-serial conversion results by converting at least one of each concurrent pair of (n+1)-parallel-bit channel words to serial-bit form; and
    a control signal generator for selecting a prescribed spectral response for the one of the parallel tracks on said magnetic recording medium being currently recorded, for determining from said second parallel-to-serial conversion results how much respective spectral responses for "positive"-information and "negative"-information (n+1)-parallel-bit channel words most recently generated by said first and second precoders will deviate in energy from said prescribed spectral response if recorded in a prescribed non-return-to-zero-invert-on-ONEs format, and for comparing the amplitudes of the respective deviation results for the "positive"-information and "negative"-information (n+1)-parallel-bit channel words most recently generated by said first and second precoders, to generate a control signal indicating which one of said "positive"-information and "negative"-information (n+1)-bit channel words has a spectral response that least deviates from said prescribed spectral response.

2. Digital signal recording apparatus as claimed in claim 1, wherein said first precoder essentially consists of a first aT encoder for aT coding each (n+1)-parallel-bit "positive" information word; wherein said second precoder essentially consists of a second aT encoder for aT coding each (n+1)-parallel-bit "positive" information word; and wherein said digital signal recording apparatus further comprises:
    circuitry for establishing the same conditions for continued aT encoding by said second precoder as exist for continued aT encoding by said first precoder, when said control signal generator indicates said "positive"-information (n+1)-bit channel word has a spectral response that least deviates from said prescribed spectral response; and
    circuitry for establishing the same conditions for continued aT encoding by said first precoder as exist for continued aT encoding by said second precoder, when said control signal generator indicates said "negative"-information (n+1)-bit channel word has a spectral response that least deviates from said prescribed spectral response.

3. Digital signal recording apparatus as claimed in claim 2, wherein said control signal generator comprises:
    code-to-arithmetic mapper circuitry for transforming to digital arithmetic form each serial bit within said second parallel-to-serial conversion results, each logic ONE in a channel word being transformed to a first arithmetic value and each logic ZERO in the same channel word being transformed to a second digital arithmetic value of opposite polarity to said first arithmetic value but of the same amplitude as said first arithmetic value:
    circuitry for generating a prescribed digital sum value;
    a comparator for generating said control signal in response to the polarity of the difference between first and second of said deviation results;
    first detection circuitry for detecting any deviation from said prescribed digital sum value of the digital sum value of bits of channel words previously selected for recording and of successive ones of bits in said second parallel-to-serial conversion results currently supplied by said second parallel-to-serial conversion means, as computed from arithmetic values generated by said code-to-arithmetic mapper circuitry to generate a first detection result;

circuitry for computing, for inclusion in said first deviation result, the energy of said first detection result;

second detection circuitry for detecting any deviation from said prescribed digital sum value of the digital sum value, of bits of channel words previously selected for recording and of successive ones of bits in said second parallel-to-serial conversion results currently supplied by said second parallel-to-serial conversion means, as computed from arithmetic values generated by said code-to-arithmetic mapper circuitry, to generate a second detection result; and circuitry for computing, for inclusion in said second deviation result, the energy of said second detection result.

4. Digital signal recording apparatus as claimed in claim 3, wherein said control signal generator further comprises:

circuitry for generating samples of a sine-wave system function of a notch frequency and samples of a cosine-wave system function of said notch frequency;

a first digital multiplier multiplying the arithmetic values of bits in said second parallel-to-serial conversion results currently supplied by said second parallel-to-serial conversion means that describe "positive"-information channel words, by respective samples of said sine-wave system function of said notch frequency, for generating a first set of products;

first accumulation circuitry for generating a first accumulation result by accumulating said first set of products;

circuitry for computing, for inclusion in said first deviation result, the energy of said first accumulation result;

a second digital multiplier multiplying the arithmetic values of bits in said second parallel-to-serial conversion results currently supplied by said second parallel-to-serial conversion means that describe "positive"-information channel words, by respective samples of said cosine-wave system function of said notch frequency, for generating a second set of products;

second accumulation circuitry for generating a second accumulation result by accumulating said second set of products;

circuitry for computing, for inclusion in said first deviation result, the energy of said second accumulation result;

a third digital multiplier multiplying the arithmetic values of bits in said second parallel-to-serial conversion results currently supplied by said second parallel-to-serial conversion means that describe "negative"-information channel words, by respective samples of said sine-wave system function of said notch frequency, for generating a third set of products;

third accumulation circuitry for generating a third accumulation result by accumulating said third set of products;

circuitry for computing, for inclusion in said second deviation result, the energy of said third accumulation result;

a fourth digital multiplier multiplying the arithmetic values of bits in said second parallel-to-serial conversion results currently supplied by said second parallel-to-serial conversion means that describe "negative"-information channel words by respective samples of said cosine-wave system function of said notch frequency, for generating a fourth set of products;

fourth accumulation circuitry for generating a fourth accumulation result by accumulating said fourth set of products;

circuitry for computing, for inclusion in said second deviation result, the energy of said fourth accumulation result;

circuitry for conforming said third and fourth accumulation results to said first and second accumulation results, respectively, each time a "positive"-information channel word is selected for recording; and circuitry for conforming said first and second accumulation results to said third and fourth accumulation results, respectively, each time a "negative"-information channel word is selected for recording.

5. Digital signal recording apparatus as claimed in claim 3, wherein said prescribed digital sum value is a triangular-wave system function of a first frequency during the recording of first ones of said parallel tracks that are to have a first prescribed spectral response.

6. Digital signal recording apparatus as claimed in claim 5, wherein said prescribed digital sum value is a triangular-wave system function of a second frequency during the recording of selected second ones of said parallel tracks that are to have a second prescribed spectral response, and wherein said prescribed digital sum value is zero-valued during the recording of ones of said parallel tracks other than said first ones and said second ones, which said other tracks are to have a zeroeth prescribed spectral response.

7. Digital signal recording apparatus as claimed in claim 6, wherein said control signal generator further comprises:

circuitry for generating samples of a sine-wave system function of a second frequency and samples of a cosine-wave system function of said second frequency;

a first digital multiplier for multiplying the arithmetic values of bits in said second parallel-to-serial conversion results currently supplied by said second parallel-to-serial conversion means that describe "positive"-information channel words, by respective samples of a first multiplying function to generate a first set of products, the samples of said first multiplying function corresponding to samples of said sine-wave system function of said second frequency during the recording of said first parallel tracks;

first accumulation circuitry for generating a first accumulation result by accumulating said first set of products;

circuitry for computing, for inclusion in said first deviation result, the energy of said first accumulation result;

a second digital multiplier for multiplying the arithmetic values of bits in said second parallel-to-serial conversion results currently supplied by said second parallel-to-serial conversion means that describe "positive"-information channel words, by respective samples of a second multiplying function to generate a second set of products, the samples of said second multiplying function corresponding to samples of said cosine-wave system function of said second frequency during the recording of said first parallel tracks;

second accumulation circuitry for generating a second accumulation result by accumulating said second set of products;

circuitry for computing, for inclusion in said first deviation result, the energy of said second accumulation result;

a third digital multiplier for multiplying the arithmetic values of bits in said second parallel-to-serial conversion results currently supplied by said second parallel-to-serial conversion means that describe "negative"-information channel words, by respective samples of said first multiplying function to generate a third set of products;

third accumulation circuitry for generating a third accumulation result by accumulating said third set of products;

circuitry for computing, for inclusion in said second deviation result, the energy of said third accumulation result;

a fourth digital multiplier for multiplying the arithmetic values of bits in said second parallel-to-serial conversion results currently supplied by said second parallel-to-serial conversion means that describe "negative"-information channel words, by respective samples of said second multiplying function to generate a fourth set of products;

fourth accumulation circuitry for generating a fourth accumulation result by accumulating said fourth set of products;

circuitry for computing, for inclusion in said second deviation result, the energy of said fourth accumulation result;

circuitry for conforming said third and fourth accumulation results to said first and second accumulation results, respectively, each time a "positive"-information channel word is selected for recording; and circuitry for conforming said first and second accumulation results to said third and fourth accumulation results, respectively, each time a "negative"-information channel word is selected for recording.

8. Digital signal recording apparatus as claimed in claim 7, wherein said control signal generator further comprises:

circuitry for generating samples of a sine-wave system function of said first frequency and samples of a cosine-wave system function of said first frequency; wherein the samples of said first multiplying function correspond to samples of said sine-wave system function of said first frequency during the recording of said second parallel tracks; and wherein the samples of said second multiplying function correspond to samples of said cosine-wave system function of said first frequency during the recording of said second parallel tracks.

9. Digital signal recording apparatus as claimed in claim 8, wherein said control signal generator further comprises:

circuitry for generating samples of a prescribed square-wave system function, which said prescribed square-wave system function is of said first frequency during the recording of said first parallel tracks and is of said second frequency during the recording of said second parallel tracks;

third detection circuitry for detecting any deviation of the arithmetic values of bits in said second parallel-to-serial conversion results currently supplied by said second parallel-to-serial conversion means from said prescribed square-wave system function, to generate a third detection result indicative of the deviation of bits in said "positive"-information channel word from said prescribed square-wave system function;

fourth detection circuitry for detecting any deviation of the arithmetic values of bits in said second parallel-to-serial conversion results currently supplied by said second parallel-to-serial conversion means from said prescribed square-wave system function, to generate a fourth detection result indicative of the deviation of bits in said "negative"-information channel word from said prescribed square-wave system function;

a fifth digital multiplier for multiplying bits in said third detection result, by respective samples of a third multiplying function to generate a fifth set of products, the samples of said third multiplying function corresponding to samples of said sine-wave system function of said first frequency during the recording of said first parallel tracks and corresponding to samples of said sine-wave system function of said second frequency during the recording of said second parallel tracks;

fifth accumulation circuitry for generating a fifth accumulation result by accumulating said fifth set of products;

circuitry for computing, for inclusion in said first deviation result, the energy of said fifth accumulation result;

sixth digital multiplier for multiplying bits in said third detection result, by respective samples of a fourth multiplying function to generate a sixth set of products, the samples of said fourth multiplying function corresponding to samples of said cosine-wave system function of said first frequency during the recording of said first parallel tracks and corresponding to samples of said cosine-wave system function of said second frequency during the recording of said second parallel tracks;

sixth accumulation circuitry for generating a sixth accumulation result by accumulating said sixth set of products;

circuitry for computing, for inclusion in said first deviation result, the energy of said sixth accumulation result;

a seventh digital multiplier for multiplying bits in said fourth detection result, by respective samples of said third multiplying function to generate a seventh set of products;

seventh accumulation circuitry for generating a seventh accumulation result by accumulating said seventh set of products;

circuitry for computing, for inclusion in said second deviation result, the energy of said seventh accumulation result;

an eighth digital multiplier for multiplying bits in said fourth detection result, by respective samples of said fourth multiplying function to generate an eighth set of products;

eighth accumulation circuitry for generating an eighth accumulation result by accumulating said eighth set of products;

circuitry for computing, for inclusion in said second deviation result, the energy of said eighth accumulation result;

circuitry for conforming said seventh and eighth accumulation results to said fifth and sixth accumulation results, respectively, each time a "positive"-information channel word is selected for recording; and circuitry for conforming said fifth and sixth accumulation results to said seventh and eighth accumulation results, respectively, each time a "negative"-information channel word is selected for recording.

10. Digital signal recording apparatus as claimed in claim 1, wherein said second parallel-to-serial conversion means converts each of said "positive"-information (n+1)-parallel-bit channel words to a respective plurality m in number of serial-bit channel words supplied to said control signal generator at said system clock rate and converts each of said "negative"-information (n+1)-parallel-bit channel words to a respective plurality m in number of serial-bit channel words supplied to said control signal generator at said system clock rate, m being a positive integer at least two.

11. Digital signal recording apparatus as claimed in claim 10, wherein m equals two.

12. Digital signal recording apparatus as claimed in claim 1 wherein said second parallel-to-serial conversion means converts said "positive"-information and "negative"-information (n+1)-parallel-bit channel words to respective (n+1)-serial-bit channel words, each of which is supplied to said control signal generator at a second clock rate that is substantially higher than said system clock rate.

13. Digital signal recording apparatus as claimed in claim 12 wherein said second clock rate is a multiple of said system clock rate.

14. Digital signal recording apparatus as claimed in claim 13 wherein said second clock rate is twice said system clock rate.

15. Digital signal recording apparatus for converting successively supplied n-bit information words each into a corresponding (n+1)-bit channel word and recording the converted words as digital information within one of parallel tracks on a magnetic recording medium, said apparatus comprising:

an input port for receiving said successively supplied n-bit information words in parallel-bit form;

circuitry for inserting a "0" bit into each said received n-bit information word and generating a (n+1)-parallel-bit "positive"-information word at an information word rate slower by a factor of (n+1) than the rate of a system clock;

circuitry for inserting a "1" bit into each said received n-bit information word and generating a (n+1)-parallel-bit "negative"-information word at an information word rate slower by a factor of (n+1) than the rate of said system clock, which (n+1)-parallel-bit "negative"-information word is supplied concurrently with said(n+1)-parallel-bit "positive"-information word generated from the same one of said n-bit information words;

a first precoder for coding each (n+1)-parallel-bit "positive"-information word to convert it into a corresponding "positive"-information (n+1)-parallel-bit channel word, generated at a channel word rate slower by a factor of (n+1) than the rate of said system clock;

a second precoder for coding each (n+1)-parallel-bit "negative"-information word to convert it into a corresponding "negative"-information (n+1)-parallel-bit channel word, generated at said channel word rate;

a first time-share-multiplexer for separating each of said "positive"-information (n+1)-parallel-bit channel words supplied from first precoder into one respective pair of "positive"-information divided-channel words and converting said divided-channel words into serial-bit form clocked in accordance with said system clock;

a second time-share-multiplexer for separating each of said "negative"-information (n+1)-parallel-bit channel words supplied from said second precoder apparatus into one respective pair of "negative"-information divided-channel words, and converting said divided-channel words into serial-bit form clocked in accordance with said system clock;

a control signal generator for selecting a prescribed spectral response for the one of the parallel tracks on said magnetic recording medium being currently recorded, for determining how much spectral responses for each pair of serial-bit divided-channel words deviate in energy from said prescribed spectral response to generate respective deviation results, and for comparing the amplitudes of said respective deviation results generated at the same time to generate a control signal for selecting the one of said "positive"-information and "negative"-information (n+1)-bit channel words the spectral response of which least deviates from said prescribed spectral response, thus to control the digital sum value of the selected ones of said (n+1)-bit channel words so as to exhibit an intended pattern as a time function; and recording means for recording in said one of the parallel tracks on said magnetic recording medium being currently recorded, as a serial-bit channel word the bits of which are clocked in accordance with said system clock, the (n+1)-parallel-bit that one of the channel words that are supplied in parallel from said first and second precoders which least deviates from said prescribed spectral response, as selected in response to said control signal of said control signal generator.

16. Digital signal recording apparatus as claimed in claim 15, wherein said recording means comprises:

parallel-to-serial signal conversion apparatus for converting, into an (n+1)-serial-bit channel word for recording with a bit rate in accordance with said system clock, each (n+1)-parallel-bit channel word supplied from said first and second precoders that is selected for recording in response to said control signal of said control signal generating means.

17. Digital signal recording apparatus as claimed in claim 15, wherein said recording means comprises:

a first parallel-to-serial converter for converting each said "positive"-information (n+1)-parallel-bit channel word currently supplied from said first precoder into a respective "positive"-information (n+1)-serial-bit channel word the bits of which are generated according to said system clock signal;

a second parallel-to-serial converter for converting each said "negative"-information (n+1)-parallel-bit channel word currently supplied from said second precoder into a respective "negative"-information (n+1)-serial-bit channel word the bits of which are generated according to said system clock signal; and a selector switch responding to said control signal to select, for recording on said one of the parallel tracks on said magnetic recording medium being currently recorded, the one of said currently generated "positive"-information and "negative"-information (n+1)-serial-bit channel words which least deviates from said prescribed spectral response.

18. Digital signal recording apparatus as claimed in claim 15, wherein said first precoder essentially consists of a first 2T encoder for 2T coding each (n+1)-parallel-bit "positive" information word; wherein said second precoder essentially consists of a second 2T encoder for 2T coding each (n+1)-parallel-bit "negative" information word; and wherein said digital signal recording apparatus further comprises:

first precoder initialization circuitry for establishing the same conditions for continued 2T encoding by said first precoder as exist for continued 2T encoding by said second precoder, when said control signal generator indicates said "negative"-information (n+1)-bit channel word has a spectral response that least deviates from said prescribed spectral response; and second precoder initialization circuitry for establishing the same conditions for continued 2T encoding by said second precoder as exist for continued 2T encoding by said first precoder, when said control signal generator indicates said "positive"-information (n+1)-bit channel word has a spectral response that least deviates from said prescribed spectral response.

19. Digital signal recording apparatus as claimed in claim 18, wherein said control signal generator, in response to said divided-channel words supplied thereto in serial-bit form from said first and second time-share-multiplexers, generates a control signal for selecting the channel word from said first and second 2T precoders that is to be recorded in said one of the tracks on said magnetic recording medium being currently recorded, and generates further control signals for controlling said first precoder initialization circuitry and said second precoder initialization circuitry.

20. Digital signal recording apparatus as claimed in claim 15, wherein said first time-share-multiplexer separates each of said "positive"-information (n+1) parallel-bit channel words currently supplied from said first precoder into serial-bit odd and even "positive"-information channel words, and wherein said second time-share-multiplexer separates each of said "negative"-information (n+1) parallel-bit channel words currently supplied from said second precoder into serial-bit odd and even "negative"-information channel words.

21. Digital signal recording apparatus as claimed in claim 20, wherein said control signal generator comprises:
  code-to-arithmetic mapper circuitry for transforming to arithmetic form each serial bit within said serial-bit divided-channel words, each logic ONE in a serial-bit divided-channel word being transformed to a first arithmetic value and each logic ZERO in the same serial-bit divided-channel word being transformed to a second arithmetic value of opposite polarity to said first arithmetic value but of the same amplitude as said first arithmetic value;
  circuitry for generating a prescribed digital sum value;
  a comparator for generating said control signal in response to the polarity of the difference between first and second of said deviation results;
  first detection circuitry for detecting any deviation from said prescribed digital sum value of the digital sum value of bits of channel words previously selected for recording and of successive ones of the serial bits in said pair of "positive"-information divided-channel words supplied by said first time-share multiplexer, as computed from arithmetic values generated by said code-to-arithmetic mapper circuitry, to generate a first detection result;
  circuitry for computing, for inclusion in said first deviation result, the energy of said first detection result;
  second detection circuitry for detecting any deviation from said prescribed digital sum value of the digital sum value, of bits of channel words previously selected for recording and of successive ones of the serial bits in said pair of "negative"-information divided-channel words supplied by said second time-share multiplexer, as computed from arithmetic values generated by said code-to-arithmetic mapper circuitry, to generate a second detection result; and
  circuitry for computing, for inclusion in said second deviation result, the energy of said second detection result.

22. Digital signal recording apparatus as claimed in claim 21, wherein said prescribed digital sum value is a triangular-wave system function of a first frequency during the recording of first ones of said parallel tracks.

23. Digital signal recording apparatus as claimed in claim 22, wherein said prescribed digital sum value is a triangular-wave system function of a second frequency during the recording of second ones of said parallel tracks, and wherein said prescribed digital sum value is zero-valued during the recording of ones of said parallel tracks on said magnetic recording medium other than said first ones and said second ones.

24. Digital signal recording apparatus as claimed in claim 22, wherein said control signal generator further comprises:
  circuitry for generating odd and even samples of a sine-wave system function of a second frequency and for generating odd and even samples of a cosine-wave system function of said second frequency;
  first accumulation circuitry for generating a first accumulation result by accumulating the products of the arithmetic values of the bits of "positive"-information odd channel words serially supplied by said first time-share multiplexer, as multiplied by respective ones of odd samples of a first multiplying function and as multiplied by respective ones of odd samples of a second multiplying function, the samples of said first multiplying function corresponding to the samples of said sine-wave system function of said second frequency during the recording of said first parallel tracks, and the samples of said second multiplying function corresponding to the samples of said cosine-wave system function of said second frequency during the recording of said first parallel tracks;
  circuitry for computing, for inclusion in said first deviation result, the energy of said first accumulation result;
  second accumulation circuitry for generating a second accumulation result by accumulating the products of the arithmetic values of the bits of "positive"-information even channel words serially supplied by said first time-share multiplexer, as multiplied by respective ones of even samples of said first multiplying function and as multiplied by respective ones of even samples of said second multiplying function;
  circuitry for computing, for inclusion in said first deviation result, the energy of said second accumulation result;
  third accumulation circuitry for generating a third accumulation result by accumulating the products of the arithmetic values of the bits of "negative"-information odd channel words serially supplied by said second time-share multiplexer, as multiplied by respective ones of odd samples of said first multiplying function and as multiplied by respective ones of odd samples of said second multiplying function;
  circuitry for computing, for inclusion in said second deviation result, the energy of said third accumulation result;
  fourth accumulation circuitry for generating a fourth accumulation result by accumulating the products of the arithmetic values of the bits of "negative"-information odd channel words serially supplied by said second time-share multiplexer, as multiplied by respective ones of even samples of said first multiplying function and as multiplied by respective ones of even samples of said second multiplying function;
  circuitry for computing, for inclusion in said second deviation result, the energy of said fourth accumulation result;
  circuitry for conforming said third and fourth accumulation results to said first and second accumulation results, respectively, each time a "positive"-information channel word is selected for recording; and circuitry for conforming said first and second accumulation results to said third and fourth accumulation results, respectively, each time a "negative"-information channel word is selected for recording.

25. Digital signal recording apparatus as claimed in claim 24, wherein said control signal generator further comprises:

circuitry for genera ting odd and even samples of a sine-wave system function of said first frequency and for generating odd and even samples of a cosine-wave system function of said first frequency; wherein the samples of said first multiplying function correspond to the samples of said sine-wave system function of said first frequency during the recording of said second parallel tracks; and wherein the samples of said second multiplying function correspond to the samples of said cosine-wave system function of said first frequency during the recording of said second parallel tracks.

26. Digital signal recording apparatus as claimed in claim 25, wherein said control signal generator further comprises:

circuitry for generating odd and even samples of a prescribed square-wave system function, which said prescribed square-wave system function is of said first frequency during the recording of said first parallel tracks and is of said second frequency during the recording of said second parallel tracks;

third detection circuitry for detecting any deviation of the arithmetic values of bits in said "positive"-information odd channel word currently supplied by said first time-share multiplexer from said prescribed square-wave system function, to generate a third detection result indicative of the deviation of bits in said "positive"-information odd channel word from said prescribed square-wave system function;

fourth detection circuitry for detecting any deviation of the arithmetic values of bits in said "positive"-information even channel word currently supplied by said first time-share multiplexer from said prescribed square-wave system function, to generate a fourth detection result indicative of the deviation of bits in said "positive"-information even channel word from said prescribed square-wave system function;

fifth detection circuitry for detecting any deviation of the arithmetic values of bits in said "negative"-information odd channel word currently supplied by said second time-share multiplexer from said prescribed square-wave system function, to generate a fifth detection result indicative of the deviation of bits in said "negative"-information odd channel word from said prescribed square-wave system function;

sixth detection circuitry for detecting any deviation of the arithmetic values of bits in said "negative"-information even channel word currently supplied by said second time-share multiplexer from said prescribed square-wave system function, to generate a sixth detection result indicative of the deviation of bits in said "negative"-information even channel word from said prescribed square-wave system function;

fifth accumulation circuitry for generating a fifth accumulation result by accumulating the products of the bits of said third detection result serially supplied by said third detection circuitry, as multiplied by respective ones of odd samples of a third multiplying function and as multiplied by respective ones of odd samples of a fourth multiplying function, the samples of said third multiplying function corresponding to the samples of said sine-wave system function of said first frequency during the recording of said first parallel tracks and corresponding to the samples of said sine-wave system function of said second frequency during the recording of said second parallel tracks, and the samples of said fourth multiplying function corresponding to the samples of said cosine-wave system function of said first frequency during the recording of said first parallel tracks and corresponding to the samples of said cosine-wave system function of said second frequency during the recording of said second parallel tracks;

circuitry for computing, for inclusion in said first deviation result, the energy of said fifth accumulation result;

sixth accumulation circuitry for generating a sixth accumulation result by accumulating the products of the bits of said fourth detection result serially supplied by said fourth detection circuitry, as multiplied by respective ones of even samples of said third multiplying function and as multiplied by respective ones of even samples of said fourth multiplying function;

circuitry for computing, for inclusion in said first deviation result, the energy of said sixth accumulation result;

seventh accumulation circuitry for generating a seventh accumulation result by accumulating by accumulating the products of the bits of said fifth detection result serially supplied by said fifth detection circuitry, as multiplied by respective ones of the odd samples of said third multiplying function and as multiplied by respective ones of the odd samples of said fourth multiplying function;

circuitry for computing, for inclusion in said second deviation result, the energy of said seventh accumulation result;

eighth accumulation circuitry for generating an eighth accumulation result by accumulating the products of the bits of the sixth detection result serially supplied by said sixth detection circuitry, as multiplied by respective ones of the even samples of said third multiplying function and as multiplied by respective ones of the even samples of said fourth multiplying function;

circuitry for computing, for inclusion in said second deviation result, the energy of said eighth accumulation result;

circuitry for conforming said seventh and eighth accumulation results to said fifth and sixth accumulation results, respectively, each time a "positive"-information channel word is selected for recording; and circuitry for conforming said fifth and sixth accumulation results to said seventh and eighth accumulation results, respectively, each time a "negative"-information channel word is selected for recording.

27. Digital signal recording apparatus as claimed in claim 15, wherein said control signal generator comprises:

code-to-arithmetic mapper circuitry for transforming to arithmetic form each serial bit within said serial-bit divided-channel words, each logic ONE in a serial-bit divided-channel word being transformed to a first arithmetic value and each logic ZERO in the same serial-bit divided-channel word being transformed to a second arithmetic value of opposite polarity to said first arithmetic value but of the same amplitude as said first arithmetic value;

circuitry for generating a prescribed digital sum value;

a comparator for generating said control signal in response to the polarity of the difference between first and second of said deviation results;

first detection circuitry for detecting any deviation from said prescribed digital sum value of the digital sum value of bits of channel words previously selected for recording and of successive ones of the serial bits in said pair of "positive"-information divided-channel words supplied by said first time-share multiplexer, as computed from arithmetic values generated by said code-to-arithmetic mapper circuitry, to generate a first detection result;

circuitry for computing, for inclusion in said first deviation result, the energy of said first detection result;

second detection circuitry for detecting any deviation from said prescribed digital sum value of the digital sum value, of bits of channel words previously selected for recording and of successive ones of the serial bits in said pair of "negative"-information divided-channel words supplied by said second time-share multiplexer, as computed from arithmetic values generated by said code-to-arithmetic mapper circuitry, to generate a second detection result; and circuitry for computing, for inclusion in said second deviation result, the energy of said second detection result.

28. Digital signal recording apparatus as claimed in claim 27, wherein said prescribed digital sum value is a triangular-wave system function of a first frequency during the recording of first ones of said parallel tracks that are to have a first prescribed spectral response.

29. Digital signal recording apparatus as claimed in claim 28, wherein said prescribed digital sum value is a triangular-wave system function of a second frequency during the recording of said second parallel tracks that are to have a second prescribed spectral response, and wherein said prescribed digital sum value is zero-valued during the recording of ones of said parallel tracks other than said first ones and said second ones, which said other tracks are to have zeroeth prescribed spectral response.

30. Digital signal recording apparatus as claimed in claim 29, wherein said control signal generator further comprises:

circuitry for generating samples of a sine-wave system function of said first frequency and for generating samples of a cosine-wave system function of said first frequency;

circuitry for generating samples of a sine-wave system function of a second frequency and for generating samples of a cosine-wave system function of said second frequency;

first accumulation circuitry for generating a first accumulation result by accumulating the products of the arithmetic values of the bits of the leading "positive"-information divided-channel words serially supplied by said first time-share multiplexer, as multiplied by corresponding samples of a first multiplying function and as multiplied by corresponding samples of a second multiplying function, the samples of said first multiplying function corresponding to samples of said sine-wave system function of said second frequency during the recording of said first parallel tracks and corresponding to samples of said sine-wave system function of said first frequency during the recording of said second parallel tracks, and the samples of said second multiplying function corresponding to the samples of said cosine-wave system function of said second frequency during the recording of said first parallel tracks and corresponding to the samples of said cosine-wave system function of said first frequency during the recording of said second parallel tracks;

circuitry for computing, for inclusion in said first deviation result, the energy of said first accumulation result;

second accumulation circuitry for generating a second accumulation result by accumulating the products of the arithmetic values of the bits of the trailing "positive"-information divided-channel words serially supplied by said first time-share multiplexer, as multiplied by corresponding samples of said first multiplying function and as multiplied by corresponding samples of said second multiplying function;

circuitry for computing, for inclusion in said first deviation result, the energy of said second accumulation result;

third accumulation circuitry for generating a third accumulation result by accumulating the products of the arithmetic values of the bits of leading "negative"-information divided-channel words serially supplied by said second time-share multiplexer, as multiplied by corresponding samples of said first multiplying function and as multiplied by corresponding samples of said second multiplying function;

circuitry for computing, for inclusion in said second deviation result, the energy of said third accumulation result;

fourth accumulation circuitry for generating a fourth accumulation result by accumulating the products of the arithmetic values of the bits of trailing "negative"-information divided-channel words serially supplied by said second time-share multiplexer, as multiplied by corresponding samples of said first multiplying function and as multiplied by corresponding samples of said second multiplying function;

circuitry for computing, for inclusion in said second deviation result, the energy of said fourth accumulation result;

circuitry for conforming said third and fourth accumulation results to said first and second accumulation results, respectively, each time a "positive"-information channel word is selected for recording; and circuitry for conforming said first and second accumulation results to said third and fourth accumulation results, respectively, each time a "negative"-information channel word is selected for recording.

31. Digital signal recording apparatus as claimed in claim 30, wherein said control signal generator further comprises:

circuitry for generating samples of a prescribed square-wave system function, which said prescribed square-wave system function is of said first frequency during the recording of said first parallel tracks and is of said second frequency during the recording of said second parallel tracks;

third detection circuitry for detecting any deviation of the arithmetic values of bits in said leading "positive"-information divided-channel word currently supplied by said first time-share multiplexer from said prescribed square-wave system function, to generate a third detection result indicative of the deviation of the arithmetic values of bits in said leading "positive"-information divided-channel word from said prescribed square-wave system function;

fourth detection circuitry for detecting any deviation of the arithmetic values of bits in said trailing "positive"-information divided-channel word currently supplied by said first time-share multiplexer from said prescribed square-wave system function, to generate a fourth detection result indicative of the deviation of the arithmetic values of bits in said trailing "positive"-information divided-channel word from said prescribed square-wave system function;

fifth detection circuitry for detecting any deviation of the arithmetic values of bits in said leading "negative"-information divided-channel word currently supplied by said second time-share multiplexer from said prescribed square-wave system function, to generate a fifth detection result indicative of the deviation of the arithmetic values of bits in said leading "negative"-information divided-channel word from said prescribed square-wave system function;

sixth detection circuitry for detecting any deviation of the arithmetic values of bits in said trailing "negative"-information divided-channel word currently supplied by said second time-share multiplexer from said prescribed square-wave system function, to generate a sixth detection result indicative of the deviation of the arithmetic values of bits in said trailing "negative"-information divided-channel word from said prescribed square-wave system function;

fifth accumulation circuitry for generating a fifth accumulation result by accumulating the products of the bits of said third detection result serially supplied by said third detection circuitry, as multiplied by corresponding samples of a third multiplying function and as multiplied by corresponding samples of a fourth multiplying function, the samples of said third multiplying function corresponding to the samples of said sine-wave system function of said first frequency during the recording of said first parallel tracks and corresponding to the samples of said sine-wave system function of said second frequency during the recording of said second parallel tracks, and the samples of said fourth multiplying function corresponding to the samples of said cosine-wave system function of said first frequency during the recording of said first parallel tracks and corresponding to the samples of said cosine-wave system function of said second frequency during the recording of said second parallel tracks;

circuitry for computing, for inclusion in said first deviation result, the energy of said fifth accumulation result;

sixth accumulation circuitry for generating a sixth accumulation result by accumulating the products of the bits of said fourth detection result serially supplied by said fourth detection circuitry, as multiplied by corresponding samples of said third multiplying function and as multiplied by corresponding samples of said fourth multiplying function;

circuitry for computing, for inclusion in said first deviation result, the energy of said sixth accumulation result;

seventh accumulation circuitry for generating a seventh accumulation result by accumulating the products of the bits of said fifth detection result serially supplied by said fifth detection circuitry, as multiplied by corresponding samples of said third multiplying function and as multiplied by corresponding samples of said fourth multiplying function;

circuitry for computing, for inclusion in said second deviation result, the energy of said seventh accumulation result;

eighth accumulation circuitry for generating an eighth accumulation result by accumulating the products of the bits of said sixth detection result serially supplied by said sixth detection circuitry, as multiplied by corresponding samples of said third multiplying function and as multiplied by corresponding samples of said fourth multiplying function;

circuitry for computing, for inclusion in said second deviation result, the energy of said eighth accumulation result;

circuitry for conforming said seventh and eighth accumulation results to said fifth and sixth accumulation results, respectively, each time a "positive"-information channel word is selected for recording; and circuitry for conforming said fifth and sixth accumulation results to said seventh and eighth accumulation results, respectively, each time a "negative"-information channel word is selected for recording.

* * * * *